(12) United States Patent
Kitahara et al.

(10) Patent No.: US 9,241,183 B2
(45) Date of Patent: Jan. 19, 2016

(54) INFORMATION PROCESSING APPARATUS, INFORMATION PROCESSING METHOD, PROGRAM, AND APPLICATION INFORMATION TABLE TRANSMITTING APPARATUS

(71) Applicant: Sony Corporation, Tokyo (JP)

(72) Inventors: Jun Kitahara, Saitama (JP); Naohisa Kitazato, Tokyo (JP)

(73) Assignee: Sony Corporation (JP)

( * ) Notice: Subject to any disclaimer, the term of this patent is extended or adjusted under 35 U.S.C. 154(b) by 22 days.

(21) Appl. No.: 14/232,997

(22) PCT Filed: Apr. 26, 2013

(86) PCT No.: PCT/JP2013/002858
§ 371 (c)(1),
(2) Date: Jan. 15, 2014

(87) PCT Pub. No.: WO2013/179570
PCT Pub. Date: Dec. 5, 2013

(65) Prior Publication Data
US 2014/0173673 A1 Jun. 19, 2014

(30) Foreign Application Priority Data
Jun. 1, 2012 (JP) .................. 2012-126370

(51) Int. Cl.
*H04N 7/173* (2011.01)
(Continued)

(52) U.S. Cl.
CPC ............ *H04N 21/43* (2013.01); *H04H 20/18* (2013.01); *H04H 60/13* (2013.01); *H04H 60/76* (2013.01); *H04N 21/4345* (2013.01); *H04N 21/454* (2013.01); *H04N 21/4622* (2013.01); *H04N 21/8173* (2013.01); *H04N 21/83* (2013.01); *H04H 2201/40* (2013.01)

(58) Field of Classification Search
USPC ..................... 725/109, 32, 41, 43
See application file for complete search history.

(56) References Cited

U.S. PATENT DOCUMENTS 8,250,615 B2 * 8/2012 Yu .................................. 725/87

FOREIGN PATENT DOCUMENTS

JP 2010-166335 A 7/2010

OTHER PUBLICATIONS

Otsuki et al., "A Methof of Controlling Presentation for Applicatiions in Hybridcast", ITE Technical Report, Feb. 9, 2012, vol. 36, No. 7, pp. 29 to 32.

(Continued)

*Primary Examiner* — Nnenna Ekpo
(74) *Attorney, Agent, or Firm* — Lerner, David, Littenberg, Krumholz & Mentlik, LLP

(57) ABSTRACT

[Object] To appropriately control simultaneous presentation of broadcast content and an application.
[Solving Means] The information processing apparatus includes: a broadcast content processor configured to receive and process broadcast content; and a controller configured to obtain an application information table, the application information table (XML-AIT) storing an application identification descriptor 24 as information specifying broadcast content, the broadcast content being capable of being presented with the application simultaneously, and to determine if it is possible to present the application and the broadcast content simultaneously or not.

4 Claims, 18 Drawing Sheets

(51) Int. Cl.
*H04N 21/43* (2011.01)
*H04H 60/13* (2008.01)
*H04N 21/83* (2011.01)
*H04H 20/18* (2008.01)
*H04H 60/76* (2008.01)
*H04N 21/434* (2011.01)
*H04N 21/454* (2011.01)
*H04N 21/462* (2011.01)
*H04N 21/81* (2011.01)

(56) References Cited

OTHER PUBLICATIONS

ETSI (European Telecommunications Standards Institute) "ETSI TS 102 796 V1.1.1 (Jun. 2010)" http://www.etsi.org/deliver/etsi_ts/102700_102799/102796/01.01.01_60/ts_102796v010101p.pdf (browsed on Oct. 21, 2011).

Association of Radio Industries and Businesses "Application execution engine platform for digital broadcasting ARIB standard STD-B23 1.2 edition" http://www.arib.or.jp/english/html/overview/doc/2-STD-B23v1_2.pdf (browsed on Oct. 21, 2011).

\* cited by examiner

FIG.2

| field | | Description |
|---|---|---|
| app_name | | Application name |
| application_identifier | | ID uniquely identifying application |
| application_descriptor | | General-purpose descriptor common to application |
| | type | Define application type |
| | control_code | Define application_control_code value |
| | visibility | Define visibility of application |
| | service_bound | Flag showing if application is valid only in current service |
| | priority | Show priority of application |
| | version | Version of application |
| | mhp_version | Version of platform profile |
| | icon | Define icon |
| | storage_capability | Capability of storage function |
| application_transport | | Transport protocol descriptor |
| application_location | | Application location descriptor |
| application_boundary | | Application boundary descriptor |
| application_specific_descriptor | | Application specific descriptor |
| application_usage_descriptor | | Application usage descriptor |
| application_mode_descriptor | | Descriptor showing mode of application |
| application_hash_descriptor | | Hash value of application |
| application_id_descriptor | | Descriptor of presentation control of combination of application and program |

21 (points to control_code row)
22 (points to application_mode_descriptor row)
23 (points to application_hash_descriptor row)
24 (points to application_id_descriptor row)

FIG.3

22 application mode descriptor

| application_mode_descriptor(){ | No. of Bits | Identifier |
|---|---|---|
| descriptor_tag | 8 | uimsbf |
| descriptor_length | 8 | uimsbf |
| application_mode | 8 | uimsbf |
| } | | |

23 application hash descriptor

| application_hash_descriptor(){ | No. of Bits | Identifier |
|---|---|---|
| descriptor_tag | 8 | uimsbf |
| descriptor_length | 8 | uimsbf |
| hash_algorithm | 8 | uimsbf |
| hash_value_length | 8 | uimsbf |
| for(i=0; i<N; i++){ | | |
| hash_value_byte | 8 | uimsbf |
| } | | |
| } | | |

FIG.4

24 application_id_descriptor

| | No. of Bits | Identifier |
|---|---|---|
| application_id_descriptor() { | | |
| descriptor_tag | 8 | uimsbf |
| descriptor_length | 8 | uimsbf |
| grant_aplication_access_flag | 1 | bslbf |
| id_check_type | 1 | bslbf |
| reserved | 6 | bslbf |
| id_num | 16 | uimsbf |
| for(i=0;i<N;i++){ | 16 | uimsbf |
| network_id | 16 | uimsbf |
| transport_stream_id | 16 | uimsbf |
| service_id | 16 | uimsbf |
| if(id_check_type==0){ | | |
| reserved | 16 | uimsbf |
| } | | |
| else if(id_check_type==1){ | | |
| event_id | 16 | uimsbf |
| } | | |
| } | | |
| } | | |

FIG.5

| Code | Identification name | Meaning |
|---|---|---|
| 0x00 | | reserved_future_use |
| 0x01 | AUTOSTART | Application is automatically started when service is selected. (This is not applied when application is already executed) |
| 0x02 | PRESENT | Show that application is executable when service is selected. Note that application is not started automatically. |
| 0x03 | DESTROY | Application finishes processing. |
| 0x04 | KILL | Application finishes processing immediately. |
| 0x05 | PREFETCH | Application file group is cached if receiver can. Application is not started. |
| 0x06 | REMOTE | Show that application is not in current transport stream. If another stream is selected, application may be obtained. |
| 0x07 | DISABLED | Shows that start of application is restricted. |
| 0x08 | PLAYBACK_AUTOSTART | If receiver reproduces from storage, application is started similar to AUTOSTART. |
| 0x09 to 0xFF | | reserved_future_use |

INFORMATION PROCESSING APPARATUS, INFORMATION PROCESSING METHOD, PROGRAM, AND APPLICATION INFORMATION TABLE TRANSMITTING APPARATUS

CROSS-REFERENCE TO RELATED APPLICATION

The present application is a national phase entry under 35 U.S.C. §371 of International Application No. PCT/JP2013/002858 filed Apr. 26, 2013, published on Dec. 5, 2013 as WO 2013/179570 A1, which claims priority from Japanese Patent Application No. JP 2012-126370 filed in the Japanese Patent Office on Jun. 1, 2012.

TECHNICAL FIELD

The present invention relates to an information processing apparatus capable of presenting broadcast content, and executing an application by using an application control table. The present disclosure further relates to an information processing method, a program, and an application information table transmitting apparatus.

BACKGROUND ART

Recently, there is known a technology capable of reproducing broadcast content and executing an application, which is delivered via a network such as the Internet, simultaneously. As such a technology, there is known a technology called Hybrid Broadcast Broadband TV (hereinafter, referred to as "HbbTV".). As HbbTV standard, "ETSI TS 102 796" (see Non-patent Document 1.) is developed in Europe. Further, "ARIB STD-B23" (see Non-patent Document 2.) standard, which is compliant with "ETSI TS 102 796" is developed in Japan.

For example, HbbTV is a system, which reproduces broadcast content and executes an application simultaneously. In such a system, a data structure called AIT section (Application Information Table) controls a life cycle of an application. The life cycle of an application means the period from the start to the end of an application. The AIT section is superimposed on broadcast content. An information terminal obtains the AIT section. The information terminal controls an application based on a code for controlling the application, which is included in the AIT section.

Further, there is known an XML-AIT described in XML format. The XML-AIT has information similar to the information that the broadcast AIT section has. The XML format is suitable to provide information on an application to a receiver apparatus by using a communication network such as the Internet.

Non-Patent Document 1: ETSI (European Telecommunications Standards Institute) "ETSI TS 102 796 V1.1.1 (2010-06)" http://www.etsi.org/deliver/etsi_ts/102700_102799/102796/01.01.01_60/ts_102796v010101p.pdf (browsed on Oct. 21, 2011)

Non-Patent Document 2: Association of Radio Industries and Businesses "Application execution engine platform for digital broadcasting ARIB standard STD-B23 1.2 edition" http://www.arib.or.jp/english/html/overview/doc/2-STD-B23v1_2.pdf (browsed on Oct. 21, 2011)

SUMMARY OF INVENTION

Problem to be Solved by the Invention

Meanwhile, let's say that broadcast content and an application are presented simultaneously. In this case, broadcast content and an application should not be presented simultaneously depending on, for example, the relation between a sponsor of a program as broadcast content and an entity relating to an application. For example, when a program B (sponsor: company A) is broadcasted, an application, which relates to a company C, should not be presented from the viewpoint of operation. Here, the company A and the company C are rival firms. In view of the above-mentioned circumstance, under the operation in which broadcast content and an application are presented simultaneously, it is desirable to provide a scheme capable of successfully controlling availability of simultaneous presentation.

Further, it is required to provide the following scheme. Let's say that it is allowed to present an application and a program of a channel X or a channel Y of a broadcast station A simultaneously. Meanwhile, it is not allowed to present an application and a program of another broadcast station. In this case, it is required to control the application as follows, for example. If a channel is changed from the channel X to the channel Y when an application is being presented, the application is continuously executed as it is. If a channel is changed in a different manner, the application is finished.

In view of the above-mentioned circumstances, a purpose of the present technology is to provide an information processing apparatus configured to appropriately control simultaneous presentation of broadcast content and an application. It is further desirable to provide an information processing method, a program, and an application information table transmitting apparatus.

Means for Solving the Problem

To solve the above-mentioned problems, according to the present technology, there is provided an information processing apparatus, including: a broadcast content processor configured to receive and process broadcast content; and a controller configured to obtain an application information table, the application information table storing information necessary to start an application and information specifying broadcast content, the broadcast content being capable of being presented with the application simultaneously, and to determine if it is possible to present the application and the broadcast content simultaneously or not.

In the information processing apparatus, the information specifying broadcast content may include a channel identifier, the channel identifier specifying a channel, and the controller may be configured to determine if it is possible to present the application and the broadcast content simultaneously or not for each channel.

In the information processing apparatus, the information specifying broadcast content may further include a first flag, the first flag defining if the channel identifier is treated as a channel allowed to present with the application simultaneously, or a channel not allowed to present with the application simultaneously, and the controller may be configured to determine if it is possible to present the application and the broadcast content simultaneously or not for each channel, depending on the first flag.

In the information processing apparatus, the information specifying broadcast content may further include an event identifier, the event identifier specifying an event, and the controller may be configured to determine if it is possible to present the application and the broadcast content simultaneously or not, for each combination of the channel and the event.

In the information processing apparatus, the information specifying broadcast content may further include a first flag, the first flag defining if the combination of the channel and the event is treated as a combination allowed to present with the application simultaneously, or a combination not allowed to present with the application simultaneously, and the controller may be configured to determine if it is possible to present the application and the broadcast content simultaneously or not for each combination, based on the first flag.

In the information processing apparatus, the information specifying broadcast content may include a channel identifier, an event identifier, and a second flag, the channel identifier specifying a channel, the event identifier specifying an event, the second flag defining if availability of simultaneous presentation of the application and the broadcast content is determined for each channel or for each combination of the channel and the event, and the controller may be configured to determine if it is possible to present the application and the broadcast content simultaneously or not for a unit defined by the second flag.

According to the present technology, there is provided an information processing method, including: receiving and processing, by a broadcast content processor, broadcast content; obtaining, by a controller, an application information table, the application information table storing information necessary to start an application and information specifying broadcast content, the broadcast content being capable of being presented with the application simultaneously; and determining, by the controller, if it is possible to present the application and the broadcast content simultaneously or not.

According to another embodiment of the present technology, there is provided a program, causing a computer to function as: a broadcast content processor configured to receive and process broadcast content; and a controller configured to obtain an application information table, the application information table storing information necessary to start an application and information specifying broadcast content, the broadcast content being capable of being presented with the application simultaneously, and to determine if it is possible to present the application and the broadcast content simultaneously or not.

According to another embodiment of the present technology, there is provided an application information table transmitting apparatus, including: a table transmitting section configured to transmit an application information table, the application information table storing information necessary to start an application and information specifying broadcast content, the broadcast content being capable of being presented with the application simultaneously.

In the application information table transmitting apparatus, the information specifying broadcast content may include a channel identifier, the channel identifier specifying a channel.

In the application information table transmitting apparatus, the information specifying broadcast content may further include a first flag, the first flag defining if the channel identifier is treated as a channel allowed to present with the application simultaneously, or a channel not allowed to present with the application simultaneously.

In the application information table transmitting apparatus, the information specifying broadcast content may further include an event identifier, the event identifier specifying an event.

In the application information table transmitting apparatus, the information specifying broadcast content may further include a first flag, the first flag defining if the combination of the channel and the event is treated as a combination allowed to present with the application simultaneously, or a combination not allowed to present with the application simultaneously.

In the application information table transmitting apparatus, the information specifying broadcast content may include a channel identifier, an event identifier, and a second flag, the channel identifier specifying a channel, the event identifier specifying an event, the second flag defining if availability of simultaneous presentation of the application and the broadcast content is determined for each channel or for each combination of the channel and the event.

Effect of the Invention

As described above, according to the present technology, it is possible to control simultaneous presentation of broadcast content and an application appropriately.

BRIEF DESCRIPTION OF DRAWINGS

FIG. 2 A diagram showing the data structure of an XML-AIT.

FIG. 3 A diagram showing the data structure of an application mode descriptor, and the data structure of an application hash descriptor.

FIG. 4 A diagram showing the data structure of an application identification descriptor.

FIG. 5 A diagram showing the definition of an application control code stored in the XML-AIT.

MODE(S) FOR CARRYING OUT THE INVENTION

Hereinafter, an embodiment of the present disclosure will be described with reference to the drawings.

<First Embodiment>

[Information Processing System]

Figure 1:
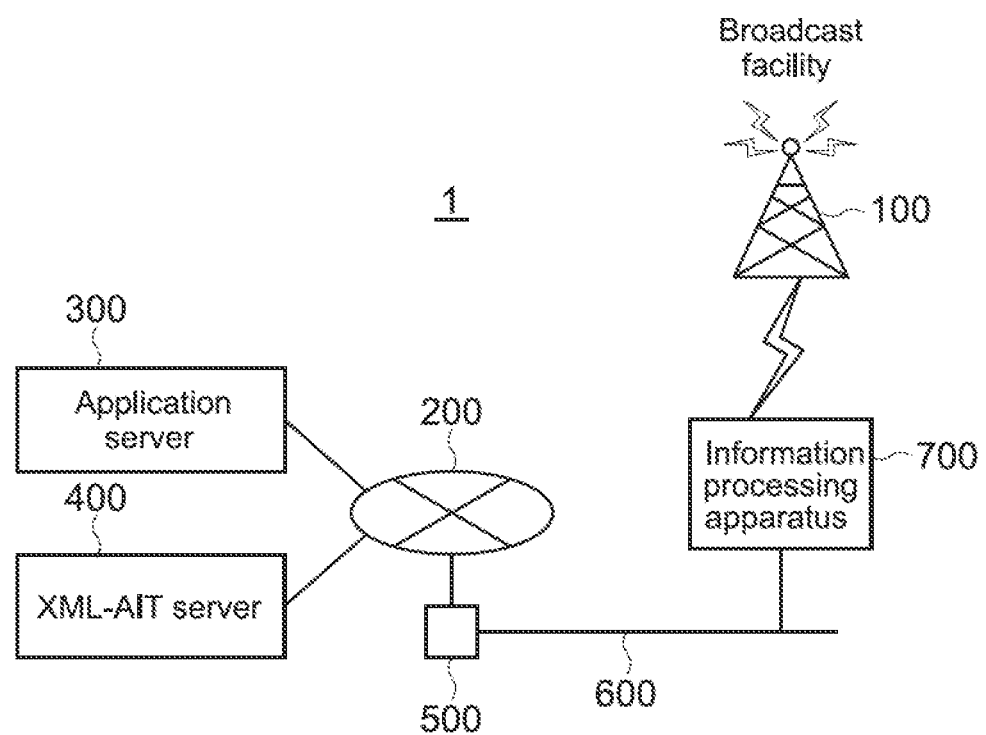
FIG. 1 A diagram schematically showing an information processing system of this embodiment.

FIG. 1 is a diagram schematically showing an information processing system of this embodiment.

An information processing system 1 of this embodiment includes a broadcast facility 100, a first network 200 such as the Internet, an application server 300, an XML-AIT server 400, an edge router 500, a second network 600 such as a LAN (Local Area Network), and an information processing apparatus 700 as a broadcasting receiver.

The broadcast facility 100 sends digital broadcast signals via a communication medium such as, for example, terrestrial waves, satellite waves, or an IP (Internet Protocol) network. The broadcast facility 100 transmits an AV stream and a so-called broadcast stream. The AV stream is obtained by multiplexing an image transport stream, a sound transport stream, a subtitle transport stream, and the like. The broadcast stream is obtained by superimposing data, which accompanies with the AV stream, and the like. Examples of the data, which accompanies with an AV stream, include a broadcast-cooperative application, an XML-AIT (Extensible Markup Language-Application Information Table), and the like. The broadcast-cooperative application is described in a markup language such as HTML or BML, or in a script language such as Java (registered trademark) script. The XML-AIT includes information for controlling an application. That is, the broadcast facility 100 behaves as an AIT transmitting apparatus, which includes a table transmitting section configured to transmit an XML-AIT.

Note that, in this embodiment, an AV stream, which is obtained by multiplexing an image transport stream, a sound transport stream, a subtitle transport stream, and the like, and which is transmitted, will be referred to as "broadcast content". The term "broadcast content" does not mean an application or an XML-AIT.

The application server 300 is configured to connect the first network 200. The application server 300 provides an application, which is processed together with broadcast content, to the information processing apparatus 700 via the first network 200. Here, the application, which is processed together with broadcast content, includes a broadcast-cooperative application and a broadcast non-cooperative application. The broadcast-cooperative application relates to broadcast content. The broadcast non-cooperative application does not relate to broadcast content. The broadcast-cooperative application is capable of obtaining various resources such as a program and data from broadcasting, and of presenting the resources. Meanwhile, the broadcast non-cooperative application does not relate to broadcast content, and thus does not access a broadcast resource.

The XML-AIT server 400 is capable of connecting the first network 200. The XML-AIT server 400 delivers an XML-AIT to the information processing apparatus 700 via the first network 200. The XML-AIT is used to control a broadcast non-cooperative application provided by the application server 300. That is, similar to the broadcast facility 100, the XML-AIT server 400 behaves as an AIT transmitting apparatus, which has a table transmitting section configured to transmit an XML-AIT.

Note that the application server 300 and the XML-AIT server 400 may be in one server. Each of the application server 300 and the XML-AIT server 400 includes a CPU, a main memory, a data storage device, a user interface, and the like. Each of the application server 300 and the XML-AIT server 400 has a structure of a typical computer. The main memory or the data storage device stores a program, which causes the computer to function as the table transmitting section.

The edge router 500 is a router configured to connect the first network 200 and the second network 600. The second network 600 may be wired or wireless.

The specific product form of the information processing apparatus 700 is not limited. The information processing apparatus 700 is, for example, a personal computer, a mobile phone, a smartphone, a television receiver, a game machine, a tablet terminal, an audio/video player, or the like.

The information processing apparatus 700 receives a digital broadcast signal from the broadcast facility 100. The information processing apparatus 700 demodulates the digital broadcast signal, to thereby obtain a transport stream. The information processing apparatus 700 is configured to divide the transport stream, to thereby obtain a broadcast stream. The information processing apparatus 700 is configured to decode the broadcast stream. The information processing apparatus 700 is configured to output the decoded broadcast stream to a display unit (not shown), a speaker unit (not shown), and a storage device (not shown), which are connected to the information processing apparatus 700.

Note that the information processing apparatus 700 may have a built-in display unit, a built-in speaker unit, and a built-in storage device. Alternatively, an independent display unit, an independent speaker unit, and an independent storage device may be connected to the information processing apparatus 700 directly or via the second network 600. Alternatively, an apparatus (not shown) including a display unit and a speaker unit may be connected to the information processing apparatus 700 directly or via the second network 600.

The information processing apparatus 700 is configured to obtain an XML-AIT, which is stored in the received transport stream in the section format. The information processing apparatus 700 is configured to interpret the XML-AIT. The information processing apparatus 700 is configured to obtain an application from the application server 300. The information processing apparatus 700 is configured to start the application, for example.

Note that the broadcast facility may transmit an XML-AIT in the above-mentioned section format or in the data carousel system.

Similarly, the information processing apparatus 700 is configured to obtain an XML-AIT file from the XML-AIT server 400. The information processing apparatus 700 is configured to interpret the XML-AIT file. The information processing apparatus 700 is configured to obtain an application, which is obtained from the application server 300. The information processing apparatus 700 is configured to start the application, for example.

[Application]

Here, an application will be described. The broadcast facility 100 or the application server 300 provides an application to the information processing apparatus 700. An application includes, for example, an HTML (Hyper Text Markup Language) document, a BML document (Broadcast Markup Language), an MHEG document (Multimedia and Hypermedia information coding), a Java (registered trademark) script, a still image file, a motion image file, and the like.

An application may be visible or invisible. A user is capable of seeing the status of a visible application on a screen. A user is not capable of seeing the status of an invisible application on a screen. An example of the invisible application is an application, which is used when a browser boots up under a transparent status invisible to a user. Another example of the invisible application is an application, which records information for specifying broadcast content watched by using an information processing apparatus, which records a watching time period for the purpose of rating survey and the like, and which delivers the recorded information to a specific server.

Further, an application may be a bidirectional application or an application, which provides information to a user unidirectionally. The bidirectional application is configured to change information and a function to be provided in response to an operation input in the information processing apparatus 700 by a user.

[Data structure of XML-AIT]

Next, the data structure of an XML-AIT will be described.

FIG. 2 is a diagram showing the data structure of an XML-AIT of this embodiment.

In the XML-AIT, an application name, an application identifier, an application descriptor, an application type, an application control code 21, visibility of an application, a flag showing if the application is valid in the current service, priority of the application, a version of the application, a version corresponding to a platform profile, an icon, a capacity of a storage function, a transport protocol descriptor, an application location descriptor, an application boundary descriptor, an application specific descriptor, an application usage descriptor, an application mode descriptor 22, an application hash descriptor 23, an application identification descriptor 24, and the like are stored for each application.

An electronic signature for detecting falsification is attached to the XML-AIT. For example, an XML signature or the like may be used as an electronic signature. Any XML signature system such as a detached signature, an enveloping signature, or an enveloped signature, may be employed. The detached signature is independent of an XML-AIT. The enveloping signature includes an XML-AIT therein. The enveloped signature is included in an XML-AIT. Note that the detached signature may be employed to limit influence on the XML-AIT format.

An application controller 708 of the information processing apparatus 700 validates the XML signature according to a core validation procedure. The core validation procedure includes reference validation and signature validation.

According to the reference validation, a canonicalization transformation process (Transform) and a digest calculation algorithm (Digest Method) are applied to a resource (XML-AIT), to thereby validate a digest value of a reference. The result obtained by the reference validation is compared with a registered digest value. If they are different, the result is invalid.

According to the signature validation, a signature information (Signature Info) element is serialized based on a canonicalization system, which is determined in an XML canonicalization algorithm (Canonicalization Method). Key data is obtained by using key information (KeyInfo) and the like. The signature is validated by using a system, which is determined in the signature algorithm (Signature Method).

FIG. 3 is a diagram showing the data structure of the application mode descriptor 22, and the data structure of the application hash descriptor 23.

The application mode descriptor 22 includes a descriptor tag (descriptor_tag), a descriptor length (descriptor_length), an application mode (application_mode), and the like. The descriptor tag (descriptor_tag) identifies the application mode descriptor 22. The application mode (application_mode) shows the mode of an application.

The application mode is information for controlling a function (API: Application Program Interface), which the application may use. Some functions limit availability of an application. Examples of such functions include a broadcast resource presentation function and the like. The broadcast resource presentation function accesses various broadcast resources such as broadcast programs and data, and presents the various broadcast resources. More specifically, the application mode value of the broadcast cooperative application is set so as to be capable of using the broadcast resource presentation function. The application mode value of the broadcast non-cooperative application, which is independent (non-cooperative) of broadcasting, is set so as not to be capable of using the broadcast resource presentation function. Note that availability of a function other than the broadcast resource presentation function may be switched based on an application mode.

Here, let's say that an application mode, which is set for a broadcast cooperative application, is "mode 1", and that an application mode, which is set for a broadcast non-cooperative application, is "mode 2".

In this situation, the application mode may be used as information, based on which the information processing apparatus 700 determines if validation of an electronic signature is necessary or not. That is, if the application mode is "mode 1", the information processing apparatus 700 determines that validation of an electronic signature is not necessary. If the application mode is "mode 2", the information processing apparatus 700 determines that validation of an electronic signature is necessary. Note that this is merely one operation form. Alternatively, validation of an electronic signature of a broadcast cooperative application may be necessary.

The application hash descriptor 23 includes a descriptor tag (descriptor_tag), a descriptor length (descriptor_length), a hash algorithm (hash_algorithm), a hash value length (hash_value_length), a hash value (hash_value_byte), and the like. The hash algorithm (hash_algorithm) shows the calculation method of a hash value. The hash value is a hash value of an application. The hash value is created based on the entity of an application by using a predetermined hash function or the like. The hash value represents the application. How to use the hash value will be described later.

FIG. 4 is a diagram showing the data structure of the application identification descriptor 24.

The application identification descriptor 24 is information, which the information processing apparatus 700 uses to determine a channel, which classifies broadcast content, or to determine if a program and an application are presented simultaneously or not.

Next, the application identification descriptor 24 will be described in detail.

The application identification descriptor 24 includes a descriptor tag (descriptor_tag), a descriptor length (descriptor_length), a grant application access flag (grant_application_access_flag), an identification check type (id_check_type), a triplet, an event identifier (event_id), and the like. The descriptor tag (descriptor_tag) shows that this is the application identification descriptor 24.

The triplet is information for identifying a channel. The triplet (channel identifier) includes a network identifier (network_id), a transport stream identifier (tranport_stream_id), a service identifier (service_id), and the like. The network identifier (network_id) is an identification value unique to a network. The transport stream identifier (tranport_stream_id) is an identification value unique to a transport stream. The service identifier (service_id) is an identification value unique to a service (channel).

The event identifier is an identification value for identifying an event (program).

The grant application access flag (first flag) is "0" or "1". If the grant application access flag is "0", the triplet value and the event identifier value, which are described in an XML-AIT, are treated as information (blacklist) identifying a channel and a program, of which simultaneous presentation with an application is restricted. If the grant application access flag is "1", the triplet value and the event identifier value, which are described in an XML-AIT, are treated as information (whitelist) identifying a channel and a program, of which simultaneous presentation with an application is allowed.

Note that information identifying a selected channel, which is obtained from PSI/SI (Program Specific Information/Service Information), is a triplet including a network identifier (network_id), a transport stream identifier (tranport_stream_id), and a service identifier (service_id). Similarly, information identifying a presented program, which is obtained from PSI/SI, is an event identifier.

The identification check type (second flag) is information determining a compared identifier. The identification check type is "0" or "1". If the identification check type is "0", only a triplet value is compared. If the identification check type is "1", the combination of a triplet value and an event identifier value is compared.

[Definition of Application Control Code]

The information processing apparatus 700 dynamically controls the life cycle of an application based on the application control code 21, which is stored in an XML-AIT.

FIG. 5 is a diagram showing the definition of the application control code 21 stored in an XML-AIT.

As shown in FIG. 5, the application control code includes, under the standard, "AUTOSTART", "PRESENT", "DESTROY", "KILL", "PREFETCH", "REMOTE", "DISABLED", and "PLAYBACK_AUTOSTART". The application control codes are defined as follows.

"AUTOSTART" is a code instructing to automatically start an application when a service is selected. This is not applied when an application is already executed.

"PRESENT" is a code instructing to make an application executable when a service is selected. Note that the target application is not started automatically when a service is selected. The target application is started when a start instruction from a user is received.

"DESTROY" is a code instructing to allow finish of an application.

"KILL" is a code instructing to finish an application forcibly.

"PREFETCH" is a code instructing to cache an application.

"REMOTE" is a code showing an application, which may not be obtained from the current transport stream. The application may be obtained from another transport stream or a cache, and may be used.

"DISABLED" is a code showing that start of an application is restricted.

"PLAYBACK_AUTOSTART" is a code for starting an application when broadcast content, which is recorded in storage (storage device), is reproduced.

[Configuration of Information Processing Apparatus]

Figure 6:
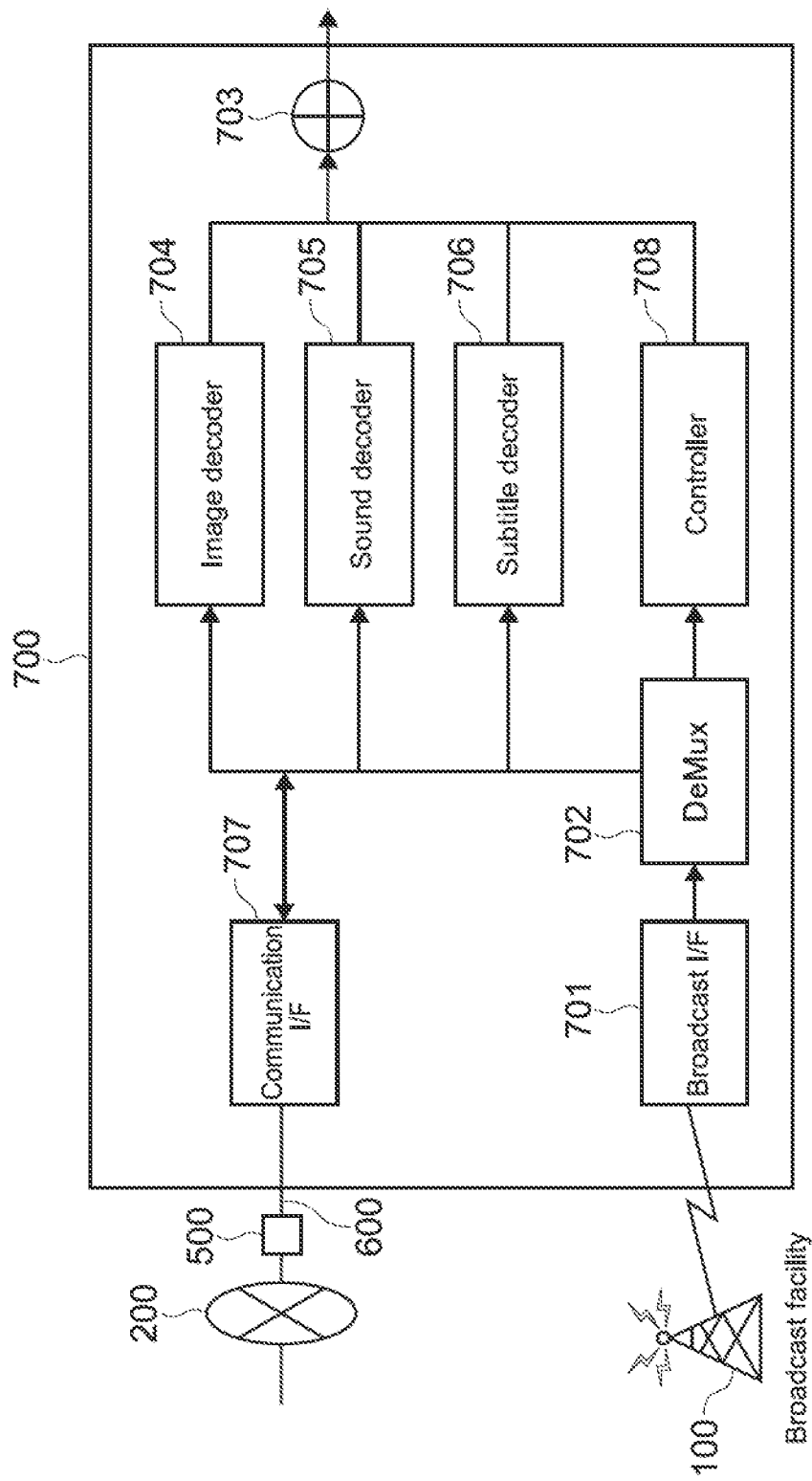
FIG. 6 A block diagram showing the structure of an information processing apparatus of this embodiment.

FIG. 6 is a block diagram showing the structure of the information processing apparatus 700 of this embodiment.

The information processing apparatus 700 includes a broadcast interface 701, a demultiplexer 702, an output processor 703, an image decoder 704, a sound decoder 705, a subtitle decoder 706, a communication interface 707, and the application controller 708 (controller).

The broadcast interface 701 includes an antenna and a tuner. The broadcast interface 701 receives a digital broadcast signal selected by a user by using the antenna and the tuner. The broadcast interface 701, for example, demodulates the received digital broadcast signal, and outputs the obtained transport stream to the demultiplexer 702.

The demultiplexer 702 demultiplexes the transport stream, to thereby obtain stream packets of broadcast content, packets of an application, and packets of an AIT section. The demultiplexer 702 demultiplexes the stream packets of the broadcast content, to thereby obtain an image ES (Elementary Stream), a sound ES, and a subtitle ES. The demultiplexer 702 provides the image ES to the image decoder 704, provides the sound ES to the sound decoder 705, provides the subtitle ES to the subtitle decoder 706, and provides packets of PSI/SI (Program Specific Information/Service Information) to the application controller 708. The packets of PSI/SI include the packets of the application and the AIT section.

The image decoder 704 decodes the image ES to thereby create an image signal. The image decoder 704 outputs the created image signal to the output processor 703. The sound decoder 705 decodes the sound ES to thereby create a sound signal. The sound decoder 705 outputs the created sound signal to the output processor 703.

The subtitle decoder 706 decodes the subtitle ES to thereby create a subtitle signal. The subtitle decoder 706 outputs the created subtitle signal to the output processor 703.

Each of the broadcast interface 701, the demultiplexer 702, the output processor 703, the image decoder 704, the sound decoder 705, and the subtitle decoder 706 is a broadcast content processor configured to receive and present broadcast content.

The communication interface 707 is configured to communicate with an external apparatus via the second network 600 such as a LAN. The communication interface 707 may communicate with an external apparatus by means of wireless or wired communication.

The application controller 708 is configured to control an application.

The output processor 703 merges the image signal from the image decoder 704, the sound signal from the sound decoder 705, the subtitle signal from the subtitle decoder 706, the image signal and the sound signal from the application controller 708, and the like. The output processor 703 outputs the merged signal to a storage device (not shown), a display unit, and a speaker unit (not shown), which are connected to the information processing apparatus 700.

A computer, which includes a CPU (Central Processing Unit) and a memory, and a program, which causes the computer to function as a broadcast content processor, the application controller 708, and the like, may provide a part of or all the configuration of the information processing apparatus 700 at least including the application controller 708.

[Behaviors of Information Processing System 1]

Next, behaviors of the information processing system 1 of this embodiment will be described.

The behaviors will be described in the following order.

1. Overall behavior 1 starting from channel switching or program transition

2. Overall behavior 2 starting from start instruction of application

3. Basic behavior of determining if application and channel (program) are presented simultaneously or not 4. Specific behavior example 1

5. Specific behavior example 2

6. Specific behavior example 3

7. Specific behavior example 4

8. Specific behavior example 5

9. Specific behavior example 6

10. Specific behavior example 7

(1. Overall Behavior 1 Starting from Channel Switching or Program Transition)

The information processing apparatus 700 receives broadcast content of a channel selected by a user by using, for example, a remote control or the like. The information processing apparatus 700 decodes image data, sound data, subtitle data, and the like. The information processing apparatus 700 outputs broadcast content to a display unit and a speaker unit, which are connected to the information processing apparatus 700.

Specifically, the broadcast interface 701 receives a digital broadcast signal of broadcast content from the broadcast facility 100 selected by a user. The broadcast interface 701, for example, demodulates the digital broadcast signal. The broadcast interface 701 outputs the obtained transport stream to the demultiplexer 702. The demultiplexer 702 demultiplexes the transport stream, to thereby obtain stream packets of the broadcast content. The demultiplexer 702 further demultiplexes the stream packets of the broadcast content, to thereby obtain an image ES, a sound ES, and a subtitle ES. The image decoder 704 decodes the obtained image ES. The sound decoder 705 decodes the obtained sound ES. The subtitle decoder 706 decodes the obtained subtitle ES. The output processor 703 merges the decoded image ES, the decoded sound ES, and the decoded subtitle ES. The output processor 703 outputs the merged signal to a display unit and a speaker unit.

The broadcast facility 100 transmits broadcast content. In addition, the broadcast facility 100 transmits, for example, an XML-AIT for an application, which relates to the broadcast content, in the section format or the data carousel system.

The information processing apparatus 700, for example, obtains an XML-AIT as an application start instruction, and behaves as follows.

Figure 7:
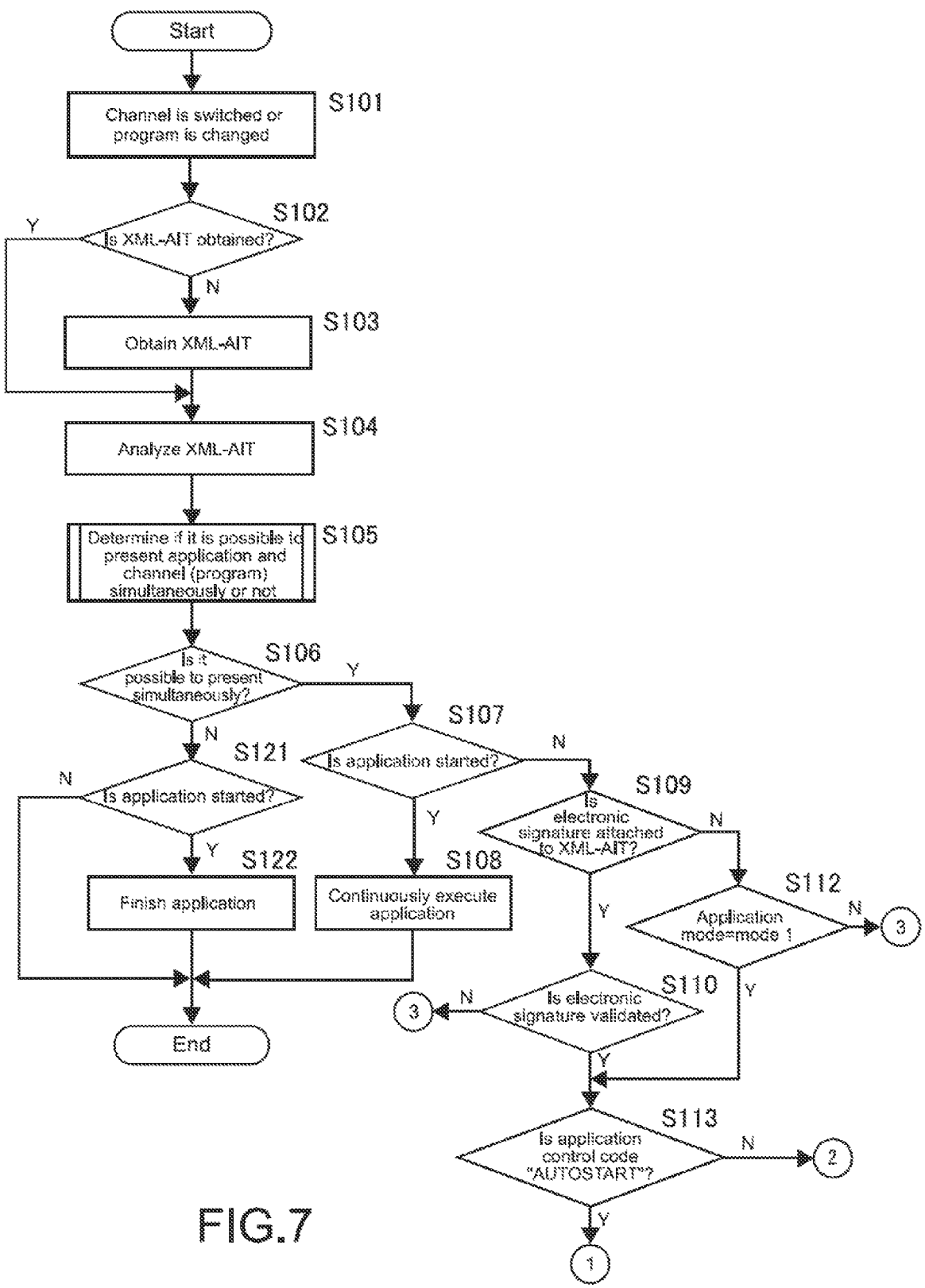
FIG. 7 A flowchart showing the flow of an overall behavior 1 in a case where a channel is switched or a program is changed in the information processing apparatus of this embodiment.
Figure 8:
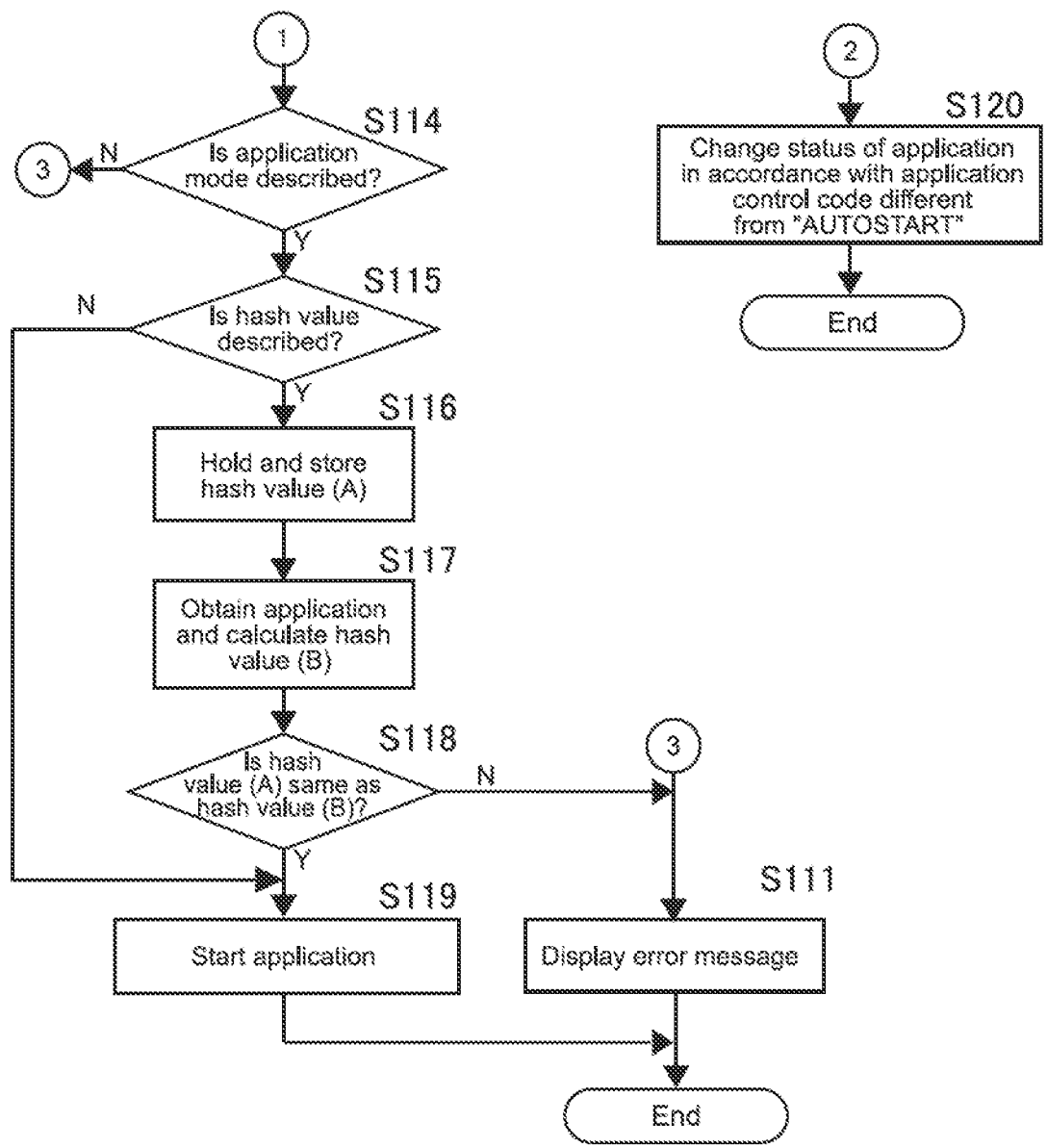
FIG. 8 A flowchart showing the flow of the overall behavior 1 of the information processing apparatus of this embodiment, similar to FIG. 7.

FIG. 7 and FIG. 8 are flowcharts showing the flow of the overall behavior in a case where a channel is switched or a program is changed in the information processing apparatus of this embodiment.

The application controller 708 of the information processing apparatus 700 detects that a channel is switched or a program is changed (Step S101). Then, the application controller 708 determines if an XML-AIT is stored in the information processing apparatus 700 (Step S102). If an XML-AIT is stored, the application controller 708 analyzes the XML-AIT (Step S104). If an XML-AIT is not stored, the application controller 708 obtains the XML-AIT (Step S103), and analyzes the XML-AIT (Step S104).

The application controller 708 determines if it is possible to present the application and a channel or a program simultaneously or not, based on the XML-AIT analysis result in accordance with a predetermined algorithm (Step S105). How to determine if it is possible to present the application and a channel or a program simultaneously or not will be described later in detail.

The application controller 708 determines that it is possible to present the application and a channel or a program simultaneously (Step S106, Y). In this case, the application controller 708 determines if the application is started already (Step S107). If the application is started already (Step S107, Y), the application is continuously executed as it is (Step S108), and the flow is finished.

If the application is not started yet (Step S107, N), the application controller 708 determines if an electronic signature is attached to the obtained XML-AIT (Step S109). If an electronic signature is attached to the XML-AIT (Step S109, Y) the application controller 708 determines that it is necessary to validate the electronic signature, and validates the electronic signature (Step S110). If the application controller 708 fails to validate the electronic signature (Step S110, N), the application controller 708 displays an error message (FIG. 8: Step S111). If the application controller 708 successfully validates the electronic signature (Step S110, Y), the application controller 708 proceeds to Step S113.

Meanwhile, if an electronic signature is not attached to the XML-AIT (Step S109, N), the application controller 708 confirms if the application mode described in the XML-AIT is "mode 1" (Step S112). The "mode 1" is a mode value showing that validation of an electronic signature is not necessary. If the application controller 708 confirms that the application mode is "mode 1" (Step S112, Y), the application controller 708 skips validation of an electronic signature, and proceeds to Step S113. If the application mode is "mode 2" (Step S112, N), then it means that an electronic signature is not attached to the XML-AIT although validation of an electronic signature is necessary. In view of this, the application controller 708 determines occurrence of an error, and displays an error message (Step S111).

In Step S113, the application controller 708 determines if the application control code described in the XML-AIT is "AUTOSTART". If the application control code is "AUTOSTART" (Step S113, Y), the application controller 708 determines if an application mode value and a hash value are described in the XML-AIT (FIG. 8: Steps S114, S115). If an application mode value is not set in the XML-AIT (Step S114, N), the application controller 708 displays an error message (Step S111). If an application mode value is described in the XML-AIT (Step S114, Y), the application controller 708 holds a hash value (A) described in the XML-AIT (Step S116).

Next, the application controller 708 obtains an application from the application server 300 based on location information of the application, which is described in the XML-AIT. The application controller 708 calculates a hash value (B) of the application based on a hash algorithm (Step S117). The hash algorithm shows a calculation method of a hash value, which is described in the XML-AIT.

Next, the application controller 708 compares the hash value (A) to the hash value (B) (Step S118). If the hash value (A) is the same as the hash value (B) (Step S118, Y), the application controller 708 starts the application (Step S119). The started application is, for example, presented together with an image of a program, which is displayed on the display unit. Here, if the application mode of the application is "mode 2", the application controller 708 starts the application in a mode, with which the broadcast resource presentation function may not be used. If the hash value (A) is different from the hash value (B) (Step S118, N), the application controller 708 determines occurrence of an error, and displays an error message (Step S111).

Further, in Step S113, the application controller 708 determines that the application control code described in the XML-AIT is not "AUTOSTART". Then, the application controller 708 changes the status of the application in accordance with the application control code different from "AUTOSTART" (Step S120).

In Step S106, the application controller 708 determines that it is not possible to present the application and a channel or a program simultaneously. Next, this case will be described.

In this case, the application controller 708 determines if an application is started already (Step S121). If an application is started already (Step S121, Y), the application controller 708 finishes the application (Step S122), and the flow is finished. Further, if an application is not started yet (Step S121, N), the application controller 708 executes nothing, and the flow is finished.

(2. Overall Behavior 2 Starting from Channel Switching or Program Transition)

The overall behavior 1 is the flow of the overall behavior in a case where a channel is switched or a program is changed in the information processing apparatus of this embodiment. In a case where an application start instruction is generated, the following control will be performed.

Here, an application start instruction is, for example, generated specifically 1. when the information processing apparatus 700 obtains an XML-AIT, in which "AUTOSTART" is described as an application control code, 2. when a user selects an application, which he wishes to start, on an application launcher, and 3. when a user selects an application, which he wishes to start, on an application having a function of causing the information processing apparatus 700 to select an application to be started.

Figure 9:
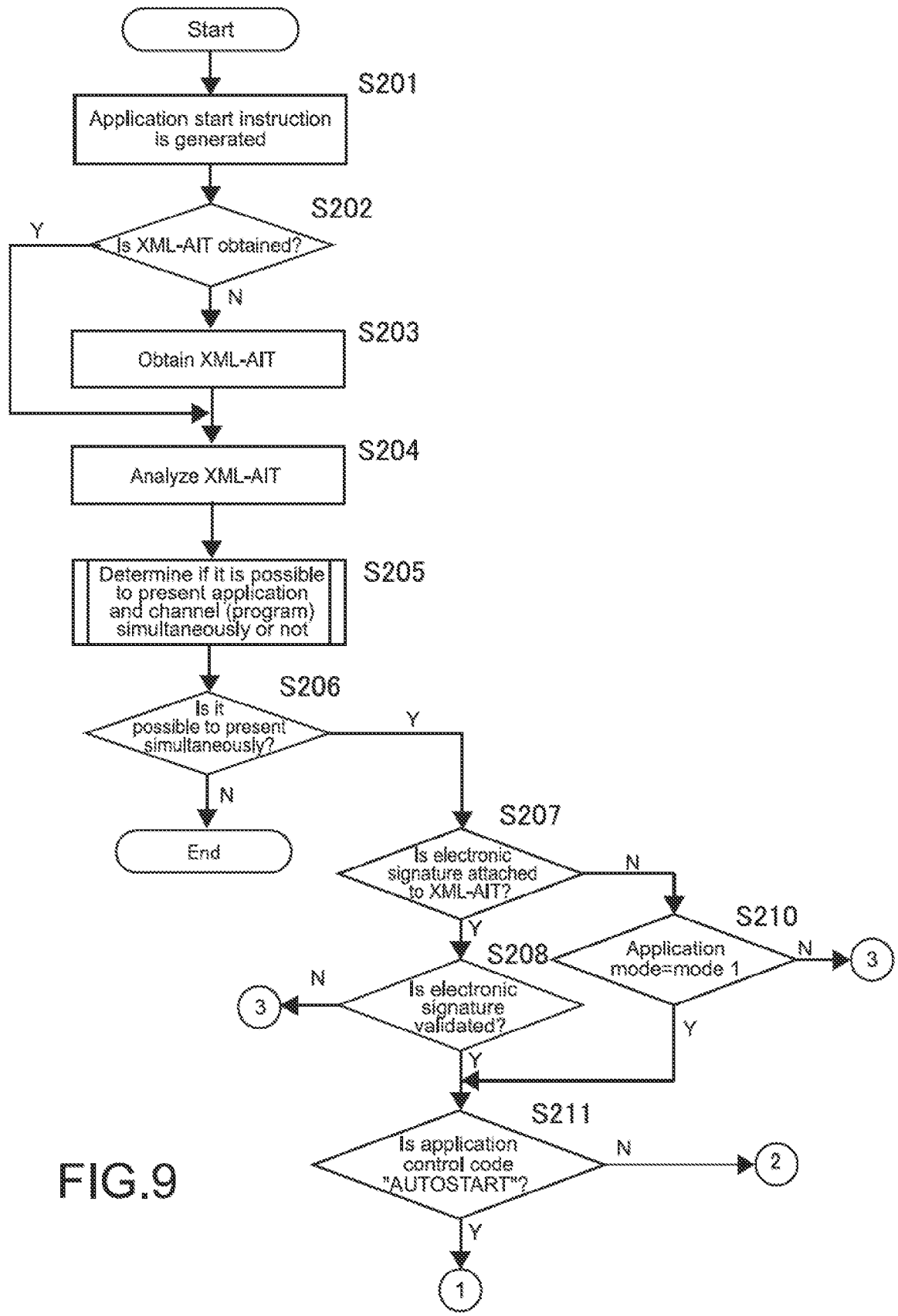
FIG. 9 A flowchart showing the flow of an overall behavior 2 in a case where an application start instruction is generated in the information processing apparatus of this embodiment.
Figure 10:
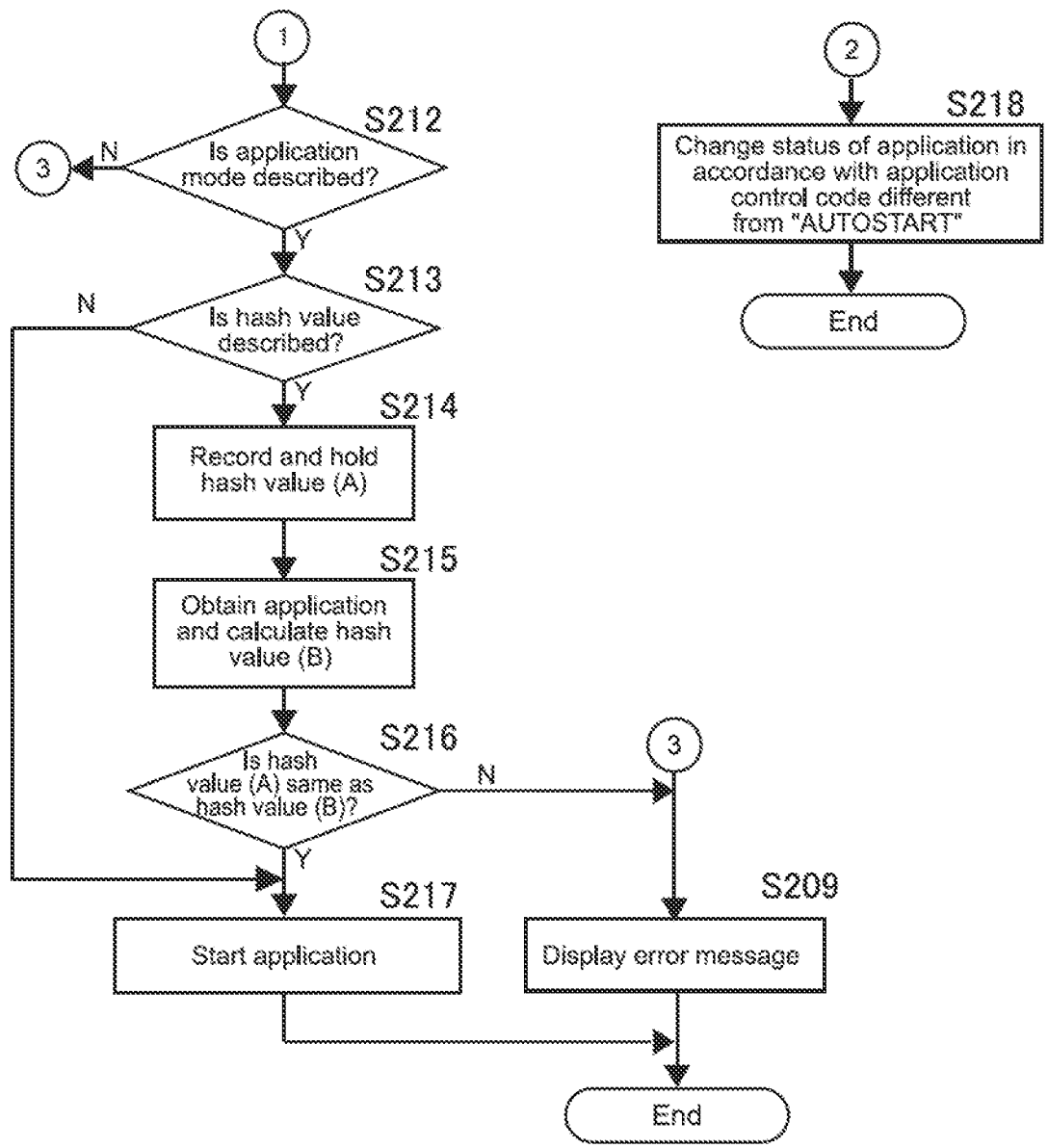
FIG. 10 A flowchart showing the flow of the overall behavior 2 of the information processing apparatus of this embodiment, similar to FIG. 9.

FIG. 9 and FIG. 10 are flowcharts showing the flow of the basic behavior in a case where an application start instruction is generated in the information processing apparatus 700 of this embodiment.

When an application start instruction is generated (Step S201), the application controller 708 of the information processing apparatus 700 determines if an XML-AIT for the application is stored in the information processing apparatus 700 (Step S202). If the XML-AIT is stored, the application controller 708 analyzes the XML-AIT (Step S204). If the XML-AIT is not stored, the application controller 708 obtains the XML-AIT (Step S203), and analyzes the XML-AIT (Step S104).

The application controller 708 determines if it is possible to present the application and a channel or a program simultaneously or not, based on the XML-AIT analysis result in accordance with a predetermined algorithm (Step S205). How to determine if it is possible to present the application and a channel or a program simultaneously or not will be described later in detail.

The application controller 708 determines that it is not possible to present the application and a channel or a program simultaneously (Step S206, N). In this case, the application controller 708, for example, executes nothing (neither validate electronic signature attached to application nor start application), and the flow is finished.

Meanwhile, if an electronic signature is attached to the XML-AIT (Step S207, N), the application controller 708 confirms if the application mode described in the XML-AIT is "mode 1" (Step S210). The "mode 1" is a mode value showing that validation of an electronic signature is not necessary. If the application controller 708 confirms that the application mode is "mode 1" (Step S210, Y), the application controller 708 skips validation of an electronic signature, and proceeds to S211. If the application mode is "mode 2" (Step S210, N), then it means that an electronic signature is not attached to the XML-AIT although validation of an electronic signature is necessary. In view of this, the application controller 708 determines occurrence of an error, and displays an error message (Step S209).

In Step S211, the application controller 708 determines if the application control code described in the XML-AIT is "AUTOSTART". If the application control code is "AUTOSTART" (Step S211, Y), the application controller 708 determines if an application mode value and a hash value are described in the XML-AIT (FIG. 10: Steps S212, S213). If an application mode value is not set in the XML-AIT (Step S212, N), the application controller 708 displays an error message (Step S209). If an application mode value is described in the XML-AIT (Step S212, Y), the application controller 708 holds a hash value (A) described in the XML-AIT (Step S214).

Next, the application controller 708 obtains an application from the application server 300 based on location information of the application, which is described in the XML-AIT. The application controller 708 calculates a hash value (B) of the application based on a hash algorithm (Step S215). The hash algorithm shows a calculation method of a hash value, which is described in the XML-AIT.

Next, the application controller 708 compares the hash value (A) to the hash value (B) (Step S216). If the hash value (A) is the same as the hash value (B) (Step S216, Y), the application controller 708 starts the application (Step S217). The started application is, for example, presented together with an image of a program, which is displayed on the display unit. Here, if the application mode of the application is "mode 2", the application controller 708 starts the application in a mode, with which the broadcast resource presentation function may not be used. If the hash value (A) is different from the hash value (B) (Step S216, N), the application controller 708 determines occurrence of an error, and displays an error message (Step S209).

Further, in Step S211, the application controller 708 determines that the application control code described in the XML-AIT is not "AUTOSTART". Then, the application controller 708 changes the status of the application in accordance with the application control code different from "AUTOSTART" (Step S218).

(3. Basic Behavior of Determining if Application and Channel (Program) are Presented Simultaneously or not)

Figure 11:
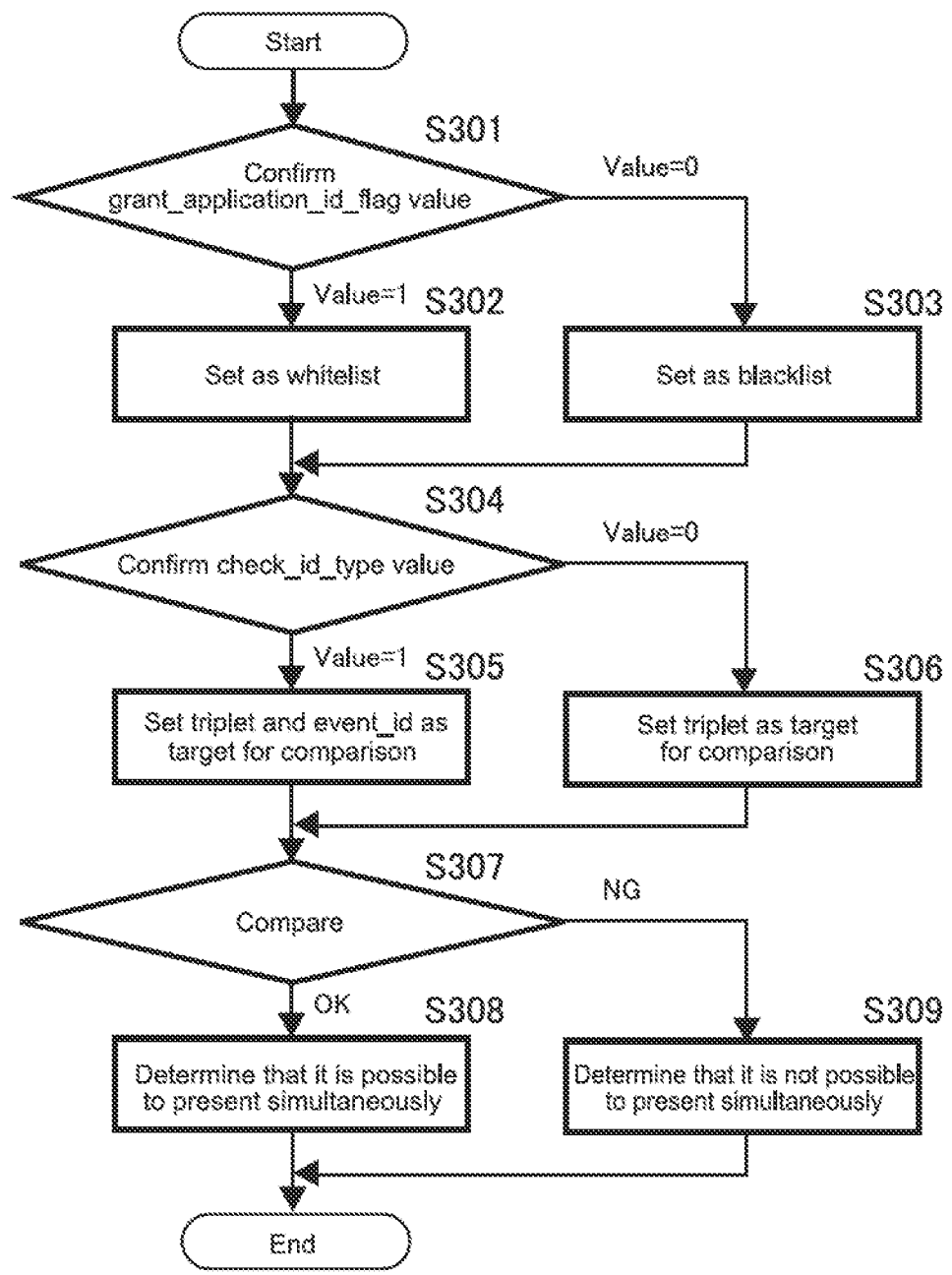
FIG. 11 A flowchart showing the flow of the basic behavior of determining if an application and a channel (program) are presented simultaneously or not.

FIG. 11 is a flowchart showing the flow of the basic behavior of determining if an application and a channel (program) are presented simultaneously or not (FIG. 7: Step S105, FIG. 9: Step S205).

The application controller 708 confirms a grant application access flag value described in the obtained XML-AIT (Step S301). If the grant application access flag value is "1", the application controller 708 sets the combination of the triplet value and the event identifier value described in the XML-AIT as a whitelist (Step S302). If the grant application access flag value is "0", the application controller 708 sets the combination of the triplet value and the event identifier value described in the XML-AIT as a blacklist (Step S303).

Next, the application controller 708 confirms an identification check type value (Step S304). If the identification check type is "1", the application controller 708 sets the combination of the triplet value and the event identifier value as a target for comparison (Step S305). If the identification check type is "0", the application controller 708 sets the triplet value as a target for comparison (Step S306).

Next, the application controller 708 compares the identifier described in the XML-AIT to the identifier of the selected channel or the presented program, in accordance with the above-mentioned set conditions (Step S307). The application controller 708 determines if the application and the channel (program) are presented simultaneously or not based on the comparison result (Steps S308, S309).

Next, specific behavior examples will be described.

(4. Specific Behavior Example 1)

Figure 12:
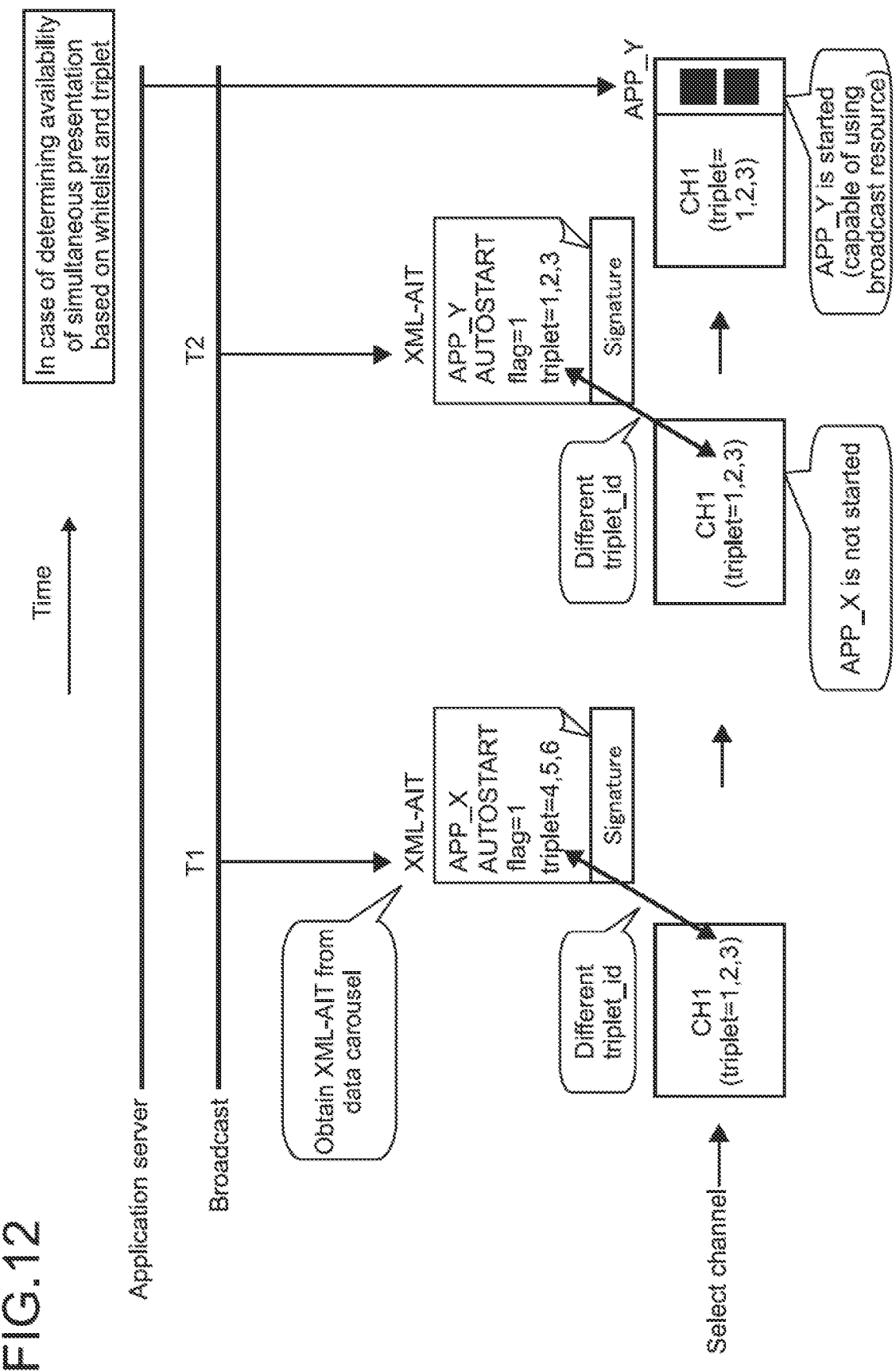
FIG. 12 A diagram showing a specific behavior example 1.

FIG. 12 is a diagram showing a specific behavior example 1.

In the information processing apparatus 700, a user selects a channel CH1, and the broadcast content of the channel CH1 is already presented. Note that the triplet value of the channel CH1 is "network_id=1, tranport_stream_id=2, and service_id=3". Hereinafter, the triplet value will be referred to as, for example, "1, 2, 3".

The broadcast facility 100 transmits an XML-AIT, which relates to a broadcast cooperative application APP_X, at the time T1. The information processing apparatus 700 obtains the XML-AIT. The XML-AIT mainly describes the following elements.

1. Location information of broadcast cooperative application APP_X
2. Application control code="AUTOSTART"
3. Grant application access flag="1"
4. Identification check type="0"
5. Triplet="4, 5, 6"

Further, an electronic signature is attached to the XML-AIT.

According to the XML-AIT, because the identification check type is "0", only the triplet value is a target for comparison. Because the grant application access flag is "1", the triplet value is treated as a whitelist. The location information is information necessary to obtain an application APP_X from the application server 300. The location information includes communication protocol information such as HTTP (Hypertext Transfer Protocol), URL (Uniform Resource Locator), and the like.

The application controller 708 of the information processing apparatus 700 obtains and analyzes the XML-AIT. The application controller 708 determines if it is possible to start the broadcast cooperative application APP_X, which is specified by the XML-AIT, or not, based on the above-mentioned element values 3 to 5 and based on the triplet value of the selected channel CH1.

According to the behavior example, only the triplet value is a target for comparison. In addition, the triplet value described in the XML-AIT is treated as a whitelist. The triplet value of the currently-selected channel CH1 is "1, 2, 3", which is different from the triplet value described in the XML-AIT as a whitelist. As a result, the application controller 708 of the information processing apparatus 700 determines that it is not possible to present the broadcast cooperative application APP_X and the channel CH1 simultaneously. That is, the application controller 708 determines that it is not possible to start the broadcast cooperative application APP_X, which is specified by the XML-AIT.

According to the behavior example, next, the broadcast facility 100 transmits an XML-AIT, which relates to a broadcast cooperative application APP_Y, at the time T2. The information processing apparatus 700 obtains the XML-AIT. The XML-AIT mainly describes the following elements.

1. Location information of broadcast cooperative application APP_Y
2. Application control code="AUTOSTART"
3. Grant application access flag="1"
4. Identification check type="0"
5. Triplet="1, 2, 3"

Further, an electronic signature is attached to the XML-AIT.

In this case, the triplet value of the currently-selected channel CH1 is the same as the triplet value described in the XML-AIT as a whitelist. Then, the application controller 708 of the information processing apparatus 700 determines that it is possible to present the broadcast cooperative application APP_Y and the channel CH1 simultaneously. That is, the application controller 708 determines that it is possible to start the broadcast cooperative application APP_Y, which is determined by the XML-AIT.

After that, the application controller 708 validates an electronic signature attached to the XML-AIT based on the above-mentioned flow of the basic behavior. If the application controller 708 successfully validates the electronic signature, the application controller 708 obtains the broadcast cooperative application APP_Y from the application server 300, because the application control code described in the XML-AIT is "AUTOSTART". The application controller 708 calculates a hash value (B) of the obtained broadcast cooperative application APP_Y. The application controller 708 compares the hash value (B) to the hash value (A), which is described in the XML-AIT. If the hash value (B) is the same as the hash value (A), the application controller 708 starts the broadcast cooperative application APP_Y.

Note that, in FIG. 12, the started broadcast cooperative application APP_Y is displayed in an area, which is different from an area in which an image of a broadcast program is displayed. However, the started broadcast cooperative application APP_Y and an image of a broadcast program are not necessarily displayed simultaneously. Alternatively, the started broadcast cooperative application APP_Y may be displayed full-screen. If an application is displayed full-screen, an image of a broadcast program is not displayed. However, even in this case, the tuner of the broadcast interface 701 is selected, and the channel CH1 is selected.

(5. Specific Behavior Example 2)

Figure 13:
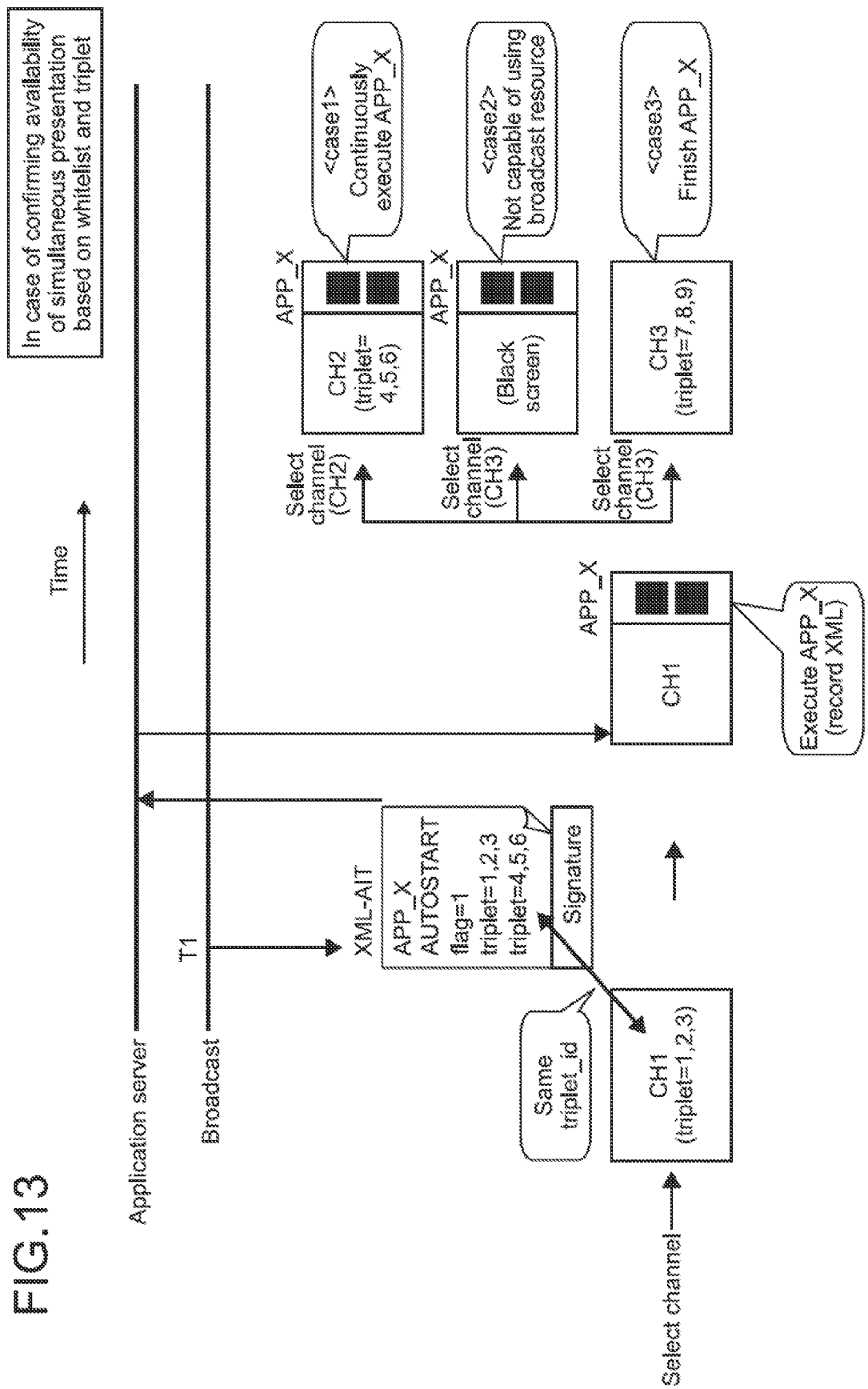
FIG. 13 A diagram showing a specific behavior example 2.

FIG. 13 is a diagram showing a specific behavior example 2.

In the information processing apparatus 700, a user selects a channel CH1, and the program of the channel CH1 is presented. Note that the triplet value of the channel CH1 is "1, 2, 3".

The broadcast facility 100 transmits the XML-AIT, which relates to the broadcast cooperative application APP_X, at the time T1. The information processing apparatus 700 obtains the XML-AIT. The XML-AIT mainly describes the following elements.

1. Location information of broadcast cooperative application APP_X
2. Application control code="AUTOSTART"
3. Grant application access flag="1"
4. Identification check type="0"
5. Triplet="1, 2, 3"
6. Triplet="4, 5, 6"

Further, an electronic signature is attached to the XML-AIT.

According to the XML-AIT, because the identification check type is "0", only the triplet value is a target for comparison. Because the grant application access flag is "1", the triplet value is treated as a whitelist.

The application controller 708 of the information processing apparatus 700 obtains and analyzes the XML-AIT. The application controller 708 determines if it is possible to start the broadcast cooperative application APP_X, which is specified by the XML-AIT, or not, based on the above-mentioned element values 3 to 6 and based on the triplet value of the selected channel CH1.

According to the behavior example, only the triplet value is a target for comparison. In addition, the triplet value described in the XML-AIT is treated as a whitelist. The triplet value of the currently-selected channel CH1 is "1, 2, 3", which is the same as the triplet value described in the XML-AIT as a whitelist. As a result, the application controller 708 of the information processing apparatus 700 determines that it is possible to present the broadcast cooperative application APP_X and the channel CH1 simultaneously. That is, the application controller 708 determines that it is possible to start the broadcast cooperative application APP_X, which is specified by the XML-AIT. After that, similar to the above, the application controller 708 firstly validates the electronic signature attached to the XML-AIT, executes processes after that, and finally starts the broadcast cooperative application APP_X.

Next, let's say that a user switches from the channel CH1 to a channel CH2 in the information processing apparatus 700. The triplet value of the channel CH2 is "4, 5, 6". In this case, the triplet value of the channel CH2 after switching is the same as the triplet value described in the XML-AIT as a whitelist. As a result, the application controller 708 of the information processing apparatus 700 determines that it is possible to present the broadcast cooperative application APP_X and the channel CH2 simultaneously. That is, the application controller 708 determines that it is possible to continuously execute the broadcast cooperative application APP_X <case 1>.

Further, let's say that a user switches from the channel CH1 to a channel CH3 in the information processing apparatus 700. The triplet value of the channel CH3 is "7, 8, 9". In this case, the triplet value of the channel CH3 after switching is different from the triplet value described in the XML-AIT as a whitelist. As a result, the application controller 708 of the information processing apparatus 700 determines that it is not possible to present the broadcast cooperative application APP_X and the channel CH3 simultaneously. The application controller 708 determines that it is not possible to continuously execute the broadcast cooperative application APP_X. The application controller 708 finishes the broadcast cooperative application APP_X <case 3>.

Note that, here, the broadcast cooperative application APP_X is finished if the triplet value of the channel CH3 after switching is different from the triplet value described in the XML-AIT as a whitelist. Alternatively, as a modified example, the broadcast cooperative application APP_X may be continuously executed, and presentation of the channel CH3 after switching may be invalid. For example, a black screen or the like may be displayed, and a character pattern, which says that it is not possible to present the broadcast cooperative application APP_X and the channel CH3 simultaneously, may be superimposed on the black screen <case 2>.

(6. Specific Behavior Example 3)

Figure 14:
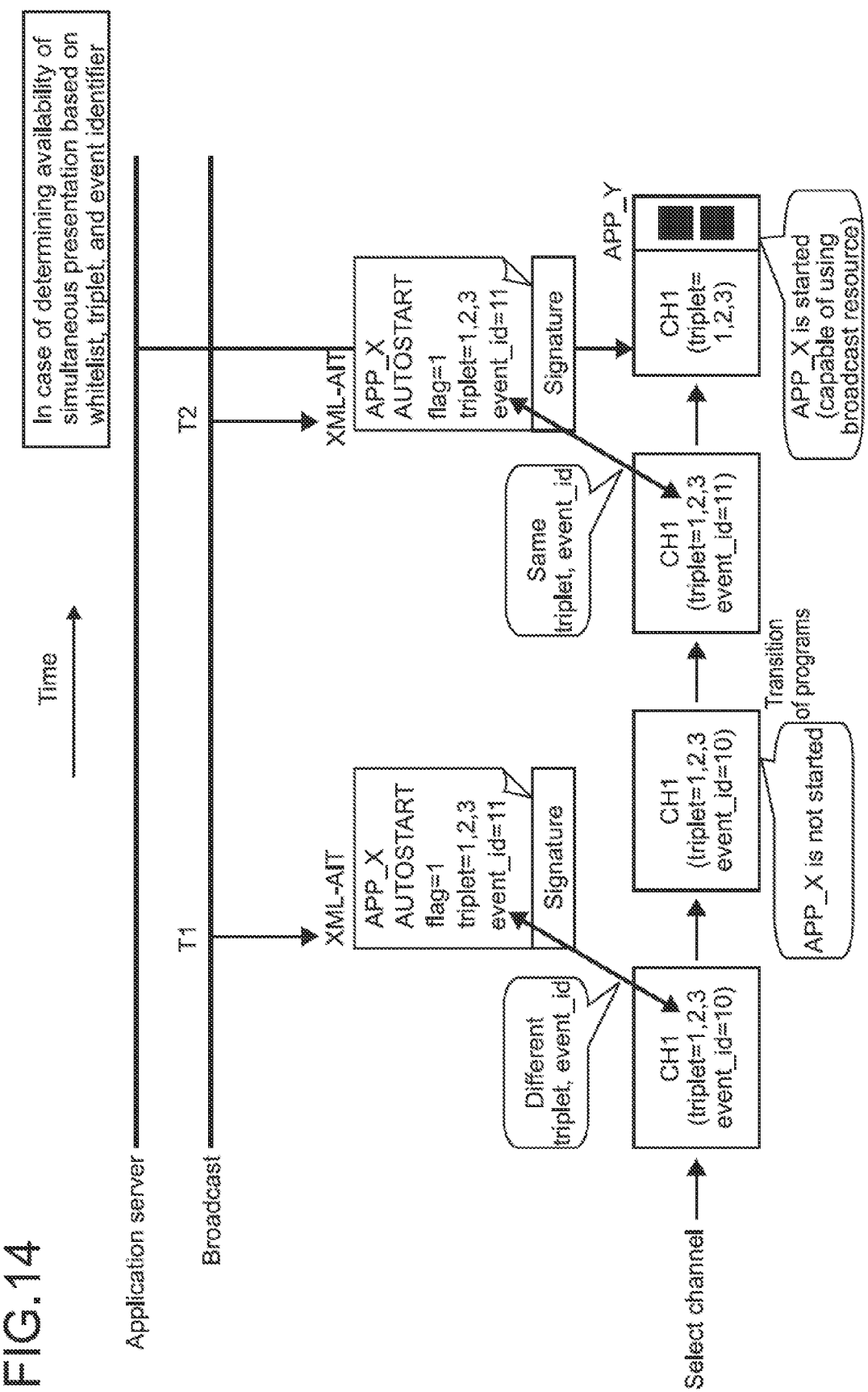
FIG. 14 A diagram showing a specific behavior example 3.

FIG. 14 is a diagram showing a specific behavior example 3.

In the information processing apparatus 700, a user selects a channel CH1, and the program of the channel CH1 is already presented. Note that the triplet value of the channel CH1 is "1, 2, 3". The event identifier value of the presented program is "10".

The broadcast facility 100 transmits an XML-AIT, which relates to a broadcast cooperative application APP_X, at the time T1. The information processing apparatus 700 obtains the XML-AIT. The XML-AIT mainly describes the following elements.

1. Location information of broadcast cooperative application APP_X
2. Application control code="AUTOSTART"
3. Grant application access flag="1"
4. Identification check type="1"
5. Triplet="1, 2, 3"
6. Event identifier="11"

Further, an electronic signature is attached to the XML-AIT.

According to the XML-AIT, because the identification check type is "1", the combination of the triplet value and the event identifier value is a target for comparison. Because the grant application access flag is "1", the combination is treated as a whitelist.

The application controller 708 of the information processing apparatus 700 obtains and analyzes the XML-AIT. The application controller 708 determines if it is possible to start the broadcast cooperative application APP_X, which is specified by the XML-AIT, or not, based on the above-mentioned element values 3 to 6 and based on the combination of the triplet value and the event identifier value of the selected channel CH1.

According to the behavior example, the combination of the triplet value and the event identifier value is a target for comparison. In addition, the combination of the triplet value and the event identifier value, which are described in the XML-AIT, is treated as a whitelist. The triplet value of the currently-selected channel CH1 is "1, 2, 3". This is the same as the triplet described in the XML-AIT as a whitelist. Meanwhile, the event identifier value of the presented program is "10". This is not the same as the event identifier value, which is described in the XML-AIT in combination with the triplet value "1, 2, 3" as a whitelist. As a result, the application controller 708 of the information processing apparatus 700 determines that it is not possible to present the broadcast cooperative application APP_X and the channel CH1 simultaneously. That is, the application controller 708 determines that it is not possible to start the broadcast cooperative application APP_X, which is specified by the XML-AIT.

According to the behavior example, transition of programs of the channel CH1, which are transmitted from the broadcast facility 100, occurs between the time T1 and the time T2. The event identifier value of a program after transition is "11". Then, the broadcast facility 100 transmits the XML-AIT, which relates to the broadcast cooperative application APP_X, at the time T2 again. The information processing apparatus 700 obtains the XML-AIT. Here, the transmitted XML-AIT at the time T2 is the same as the XML-AIT transmitted at the time T1.

Note that let's say that the application controller 708 of the information processing apparatus 700 starts a broadcast cooperative application based on the received XML-AIT. In this case, the application controller 708 stores the analysis result of the XML-AIT in the information processing apparatus 700. Meanwhile, let's say that the application controller 708 does not start the broadcast cooperative application. In this case, the application controller 708 abandons the analysis result of the received XML-AIT. Because of this, the application controller 708 obtains the XML-AIT, which relates to the broadcast cooperative application APP_X, and which the broadcast facility 100 transmits after transition of programs, again.

Here, the event identifier value of the program after transition is "11". This is the same as the event identifier value, which is described in the XML-AIT obtained again in combination with the triplet value "1, 2, 3" as a whitelist. That is, the combination of the triplet of the presented channel and the event identifier value of the program is the same as the combination of the triplet value and the event identifier value described in the XML-AIT obtained again as a whitelist. Because of this, the application controller 708 determines that it is not possible to present the broadcast cooperative application APP_X and the channel CH1 simultaneously. That is, the application controller 708 determines that it is possible to start the broadcast cooperative application APP_X, which is specified by the XML-AIT. After that, similar to the above, the application controller 708 firstly validates the electronic signature attached to the XML-AIT, executes processes after that, and finally starts the broadcast cooperative application APP_X.

(7. Specific Behavior Example 4)

Figure 15:
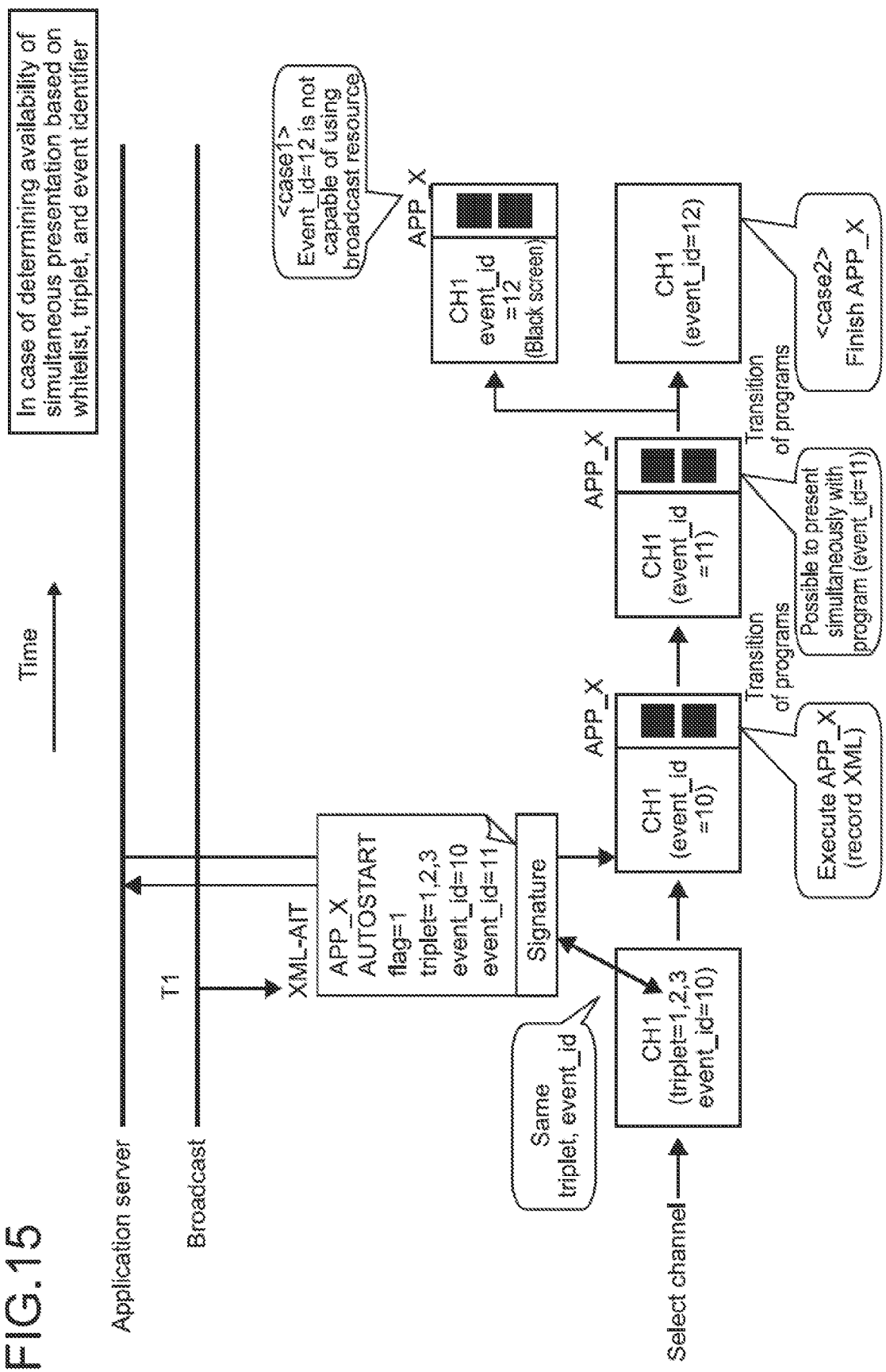
FIG. 15 A diagram showing a specific behavior example 4.

FIG. 15 is a diagram showing a specific behavior example 4.

In the information processing apparatus 700, a user selects a channel CH1, and the program of the channel CH1 is already presented. Note that the triplet value of the channel CH1 is "1, 2, 3". The event identifier value of the presented program is "10".

The broadcast facility 100 transmits an XML-AIT, which relates to a broadcast cooperative application APP_X, at the time T1. The information processing apparatus 700 obtains the XML-AIT. The XML-AIT mainly describes the following elements.

1. Location information of broadcast cooperative application APP_X
2. Application control code="AUTOSTART"
3. Grant application access flag="1"
4. Identification check type="1"
5. Triplet="1, 2, 3"
6. Event identifier="10"
7. Event identifier="11"

Further, an electronic signature is attached to the XML-AIT.

According to the XML-AIT, because the identification check type is "1", the combination of the triplet value and the event identifier value is a target for comparison. Because the grant application access flag is "1", the combination is treated as a whitelist.

The application controller 708 of the information processing apparatus 700 obtains and analyzes the XML-AIT. The application controller 708 determines if it is possible to start the broadcast cooperative application APP_X, which is specified by the XML-AIT, or not, based on the above-mentioned element values 3 to 7 and based on the combination of the triplet value and the event identifier value of the selected channel CH1.

According to the behavior example, the combination of the triplet value and the event identifier value is a target for comparison. In addition, the combination of the triplet value and the event identifier value, which are described in the XML-AIT, is treated as a whitelist. The triplet value of the currently-selected channel CH1 is "1, 2, 3". This is the same as the triplet described in the XML-AIT as a whitelist. Further, the event identifier value of the presented program is "10". This is the same as the event identifier="10", which is described in the XML-AIT in combination with the triplet value "1, 2, 3" as a whitelist. As a result, the application controller 708 of the information processing apparatus 700 determines that it is possible to present the broadcast cooperative application APP_X and the channel CH1 simultaneously. That is, the application controller 708 determines that it is possible to start the broadcast cooperative application APP_X.

After that, similar to the above, the application controller 708 firstly validates the electronic signature attached to the XML-AIT, executes processes after that, and finally starts the broadcast cooperative application APP_X. If the application controller 708 starts the broadcast cooperative application APP_X, the application controller 708 stores the analysis result of the XML-AIT in the information processing apparatus 700.

According to the behavior example, transition of programs of the channel CH1, which are transmitted from the broadcast facility 100, occurs after the time T1. The event identifier value of a program after transition is "11". The application controller 708 determines that transition of programs occurs. Then, the application controller 708 compares the analysis result of the XML-AIT, which is stored in the information processing apparatus 700, to the event identifier value of the program after transition. Here, the event identifier value of the program after transition is "11". This is the same as the event identifier value, which is described in the stored XML-AIT in combination with the triplet value "1, 2, 3" as a whitelist. As a result, the application controller 708 determines that it is possible to present the broadcast cooperative application APP_X, which is specified by the XML-AIT, and the channel CH1 simultaneously. The application controller 708 continuously executes the broadcast cooperative application APP_X.

Next, let's say that transition of programs of the channel CH1 occurs again. The event identifier value of the program after transition is "12". This is not the same as any event identifier value, which is described in the stored XML-AIT in combination with the triplet value "1, 2, 3" as a whitelist. As a result, the application controller 708 determines that it is not possible to present the broadcast cooperative application APP_X, which is specified by the XML-AIT, and the channel CH1 simultaneously. The application controller 708 finishes the broadcast cooperative application APP_X <case 2>.

As a modified example, the broadcast cooperative application APP_X may be continuously executed, and presentation of the channel CH3 after switching may be invalid. For example, a black screen or the like may be displayed, and a character pattern, which says that it is not possible to present the broadcast cooperative application APP_X and the channel CH3 simultaneously, may be superimposed on the black screen <case 1>.

(8. Specific Behavior Example 5)

Figure 16:
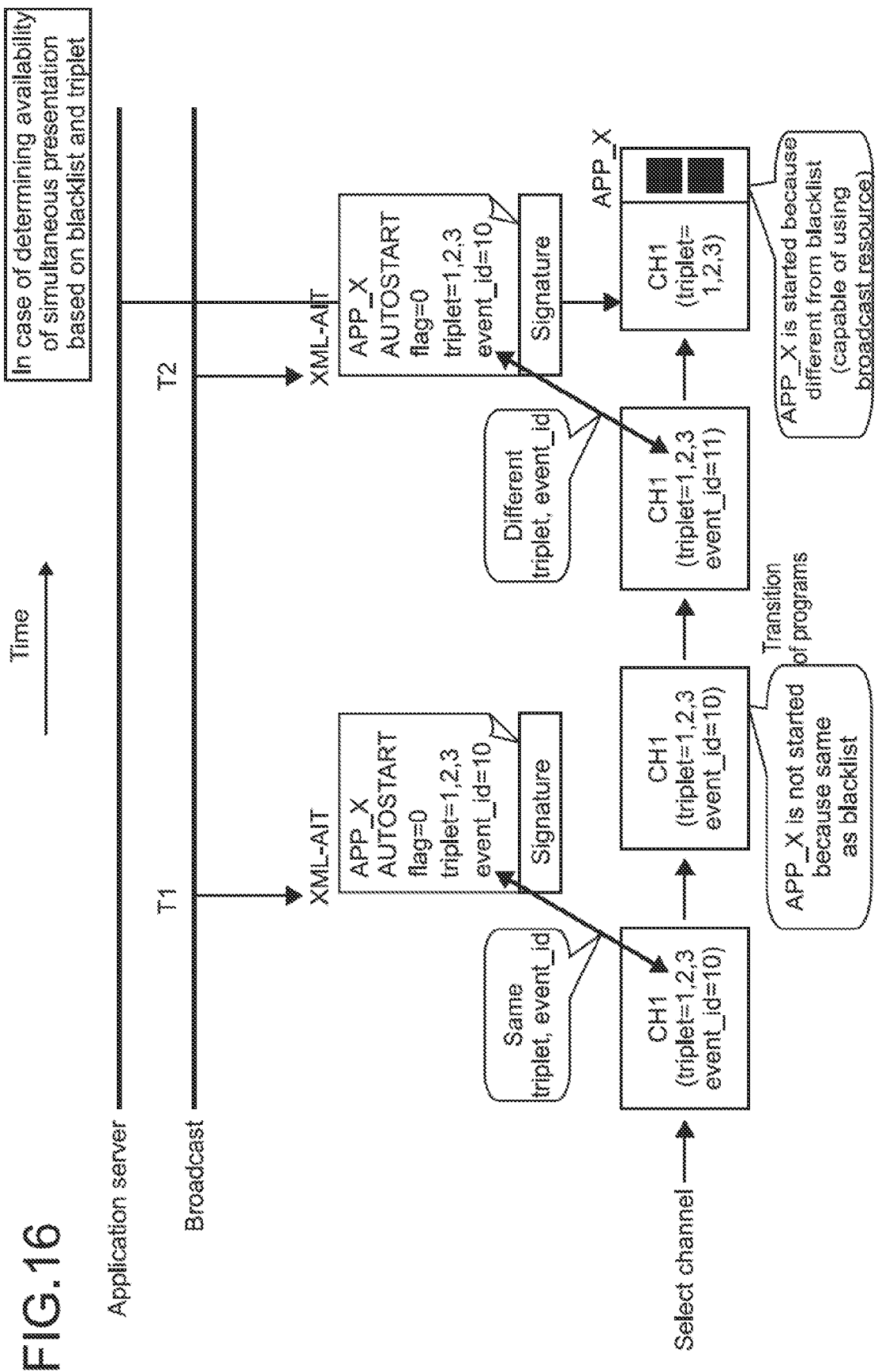
FIG. 16 A diagram showing a specific behavior example 5.

FIG. 16 is a diagram showing a specific behavior example 5.

In the information processing apparatus 700, a user selects a channel CH1, and the program of the channel CH1 is already presented. Note that the triplet value of the channel CH1 is "1, 2, 3". The event identifier value of the presented program is "10".

The broadcast facility 100 transmits an XML-AIT, which relates to a broadcast cooperative application APP_X, at the time T1. The information processing apparatus 700 obtains the XML-AIT. The XML-AIT mainly describes the following elements.

1. Location information of broadcast cooperative application APP_X
2. Application control code="AUTOSTART"
3. Grant application access flag="0"
4. Identification check type="1"
5. Triplet="1, 2, 3"
6. Event identifier="10"

Further, an electronic signature is attached to the XML-AIT.

According to the XML-AIT, because the identification check type is "1", the combination of the triplet value and the event identifier value is a target for comparison. Because the grant application access flag is "0", the combination is treated as a blacklist.

The application controller 708 of the information processing apparatus 700 obtains and analyzes the XML-AIT. The application controller 708 determines if it is possible to present the broadcast cooperative application APP_X, which is specified by the XML-AIT, and the channel CH1 simultaneously based on the above-mentioned element values 3 to 6 and based on the combination of the triplet value and the event identifier value of the selected channel CH1.

According to the behavior example, the triplet value of the currently-selected channel CH1 is "1, 2, 3". This is the same as the triplet described in the XML-AIT as a blacklist. The event identifier value of the presented program is "10". This is the same as the event identifier value described in the XML-AIT in combination with the triplet value "1, 2, 3" as a blacklist. As a result, the application controller 708 of the information processing apparatus 700 determines that it is not possible to present the broadcast cooperative application APP_X and the channel CH1 simultaneously. That is, the application controller 708 determines that it is not possible to start the broadcast cooperative application APP_X.

According to the behavior example, transition of programs of the channel CH1, which are transmitted from the broadcast facility 100, occurs between the time T1 and the time T2. The event identifier value of a program after transition is "11". Then, the broadcast facility 100 transmits the XML-AIT, which relates to the broadcast cooperative application APP_X, at the time T2 again. The information processing apparatus 700 obtains the XML-AIT. Here, the transmitted XML-AIT at the time T2 is the same as the XML-AIT transmitted at the time T1.

Here, the event identifier value of the program after transition is "11". This is not the same as the event identifier value, which is described in the XML-AIT obtained again in combination with the triplet value "1, 2, 3" as a blacklist. As a result, the application controller 708 determines that it is possible to present the broadcast cooperative application APP_X and the channel CH1 simultaneously. That is, the application controller 708 determines that it is possible to start the broadcast cooperative application APP_X. After that, similar to the above, the application controller 708 firstly validates the electronic signature attached to the XML-AIT, executes processes after that, and finally starts the broadcast cooperative application APP_X.

(9. Specific Behavior Example 6)

Figure 17:
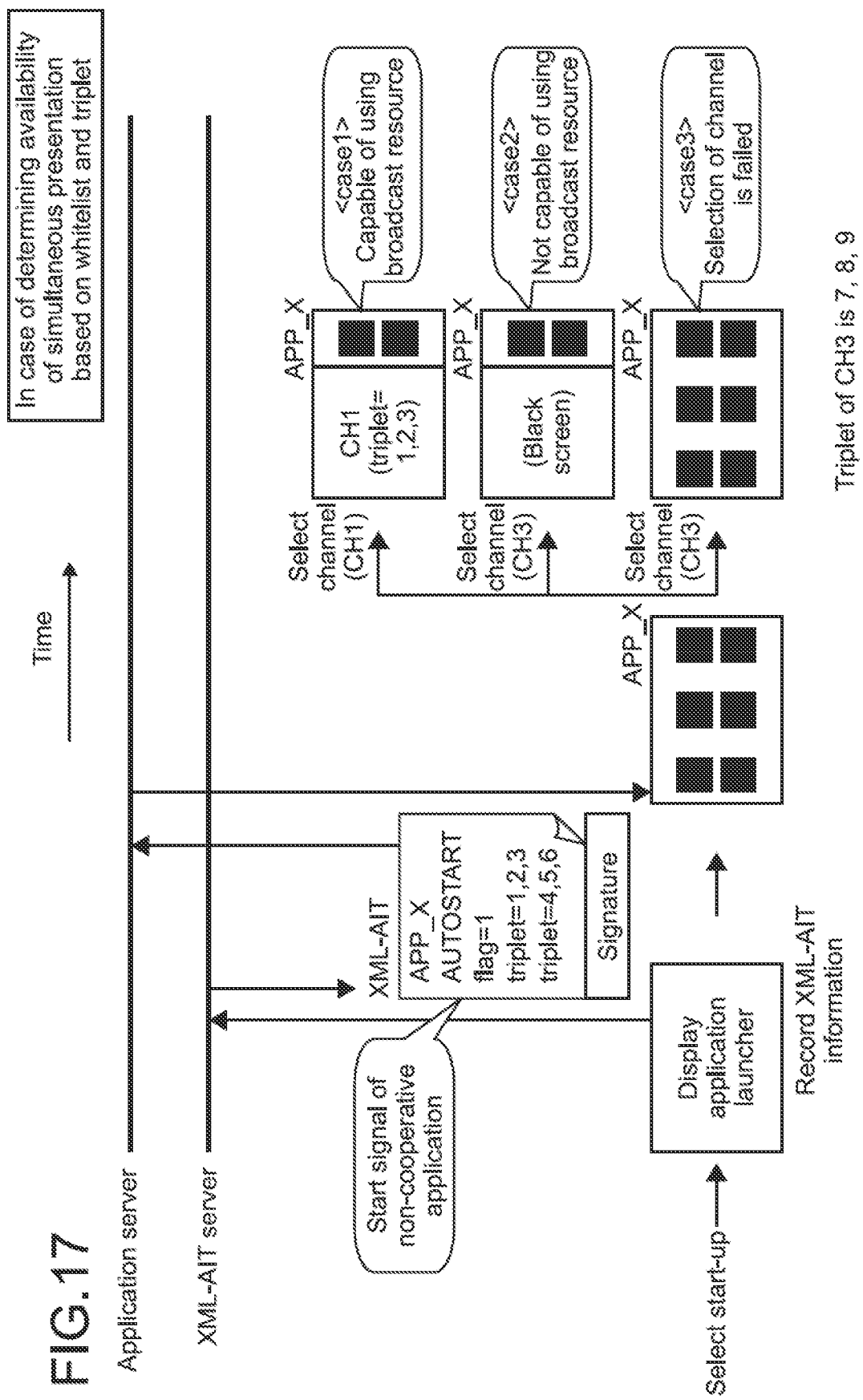
FIG. 17 A diagram showing a specific behavior example 6.

FIG. 17 is a diagram showing a specific behavior example 6.

According to the behavior example 6, an XML-AIT is obtained from the XML-AIT server 400.

The information processing apparatus 700 displays an application launcher screen, which is selected by a user by using a remote control or the like, for example. The application launcher screen is implemented by a so-called resident application installed in the information processing apparatus 700, or HTML 5, BML, or the like provided by the HTML browser. A menu and the like of a broadcast non-cooperative application are displayed on the application launcher screen. A user is allowed to select a broadcast non-cooperative application to be present by using a remote control, for example. A script and the like are built in the menu of each application. The script is used to cause the information processing apparatus 700 to obtain an XML-AIT for a broadcast non-cooperative application.

A user operates a remote control on the menu of a broadcast non-cooperative application, which is displayed on the application launcher screen. As a result, the application APP_X is selected as an arbitrary broadcast non-cooperative application. Then, the script corresponding to the broadcast non-cooperative application APP_X is executed. As a result, the application controller 708 of the information processing apparatus 700 obtains an XML-AIT for the broadcast non-cooperative application, from the XML-AIT server 400.

The XML-AIT mainly describes the following elements.

1. Location information of broadcast non-cooperative application APP_X
2. Application control code="AUTOSTART"
3. Grant application access flag="1"
4. Identification check type="0"
5. Triplet="1, 2, 3"
6. Triplet="4, 5, 6"

Further, an electronic signature is attached to the XML-AIT.

Note that, in general, an application provider, which is different from a broadcasting organization, provides a broadcast non-cooperative application.

Because of this, "mode 2" is set in the XML-AIT of the broadcast non-cooperative application, as an application mode. That is, an electronic signature is supposed to be attached to the XML-AIT essentially. In a case where the information processing apparatus 700 uses the XML-AIT, validation of the electronic signature is an essential condition.

According to the XML-AIT, because the identification check type is "0", only the triplet value is a target for comparison. Because the grant application access flag is "1", the triplet value is treated as a whitelist.

The application controller 708 of the information processing apparatus 700 obtains and analyzes the XML-AIT. At this time, a channel is not selected in the information processing apparatus 700 (channel (program) non-present status). In this situation, the application controller 708 does not determine if it is possible to present an application and a channel (program) simultaneously or not. The application controller 708 validates an electronic signature attached to the XML-AIT, and executes processes after that.

When the broadcast non-cooperative application APP_X is being executed, a user of the information processing apparatus 700 selects a channel. Then, the application controller 708 of the information processing apparatus 700 determines if it is possible to present the broadcast non-cooperative application APP_X being executed and the selected channel simultaneously or not, based on the respective element values of the XML-AIT and based on the triplet value of the selected channel.

For example, let's say that the channel CH1 is selected. The triplet value of the channel CH1 is "1, 2, 3". In this case, the triplet value of the selected channel CH1 is the same as the triplet value described in the XML-AIT as a whitelist. As a result, the application controller 708 of the information processing apparatus 700 determines that it is possible to present the broadcast non-cooperative application APP_X being executed and the channel CH1 simultaneously. As a result, both the broadcast non-cooperative application APP_X and the channel CH1 are presented <case 1>.

Further, let's say that the channel CH3 is selected. The triplet value of the channel CH3 is "7, 8, 9". In this case, the triplet value of the selected channel CH3 is not the same as the triplet value described in the XML-AIT as a whitelist. As a result, the application controller 708 of the information processing apparatus 700 determines that it is not possible to present the broadcast non-cooperative application APP_X and the channel CH3 simultaneously. Because of this, the broadcast non-cooperative application APP_X is continuously executed, and the channel CH3 is not presented <case 2 or case 3>.

Examples of methods of not presenting the channel CH3 are as follows. A black screen or the like is displayed, and a character pattern, which says that it is not possible to present the broadcast non-cooperative application APP_X and the channel CH3 simultaneously, is superimposed on the black screen <case 2>. A screen of the broadcast non-cooperative application APP_X continuously executed is displayed, and a message, which says that it is not possible to present the broadcast non-cooperative application APP_X and the channel CH3 simultaneously, is added <case 3>.

(10. Specific Behavior Example 7)

Figure 18:
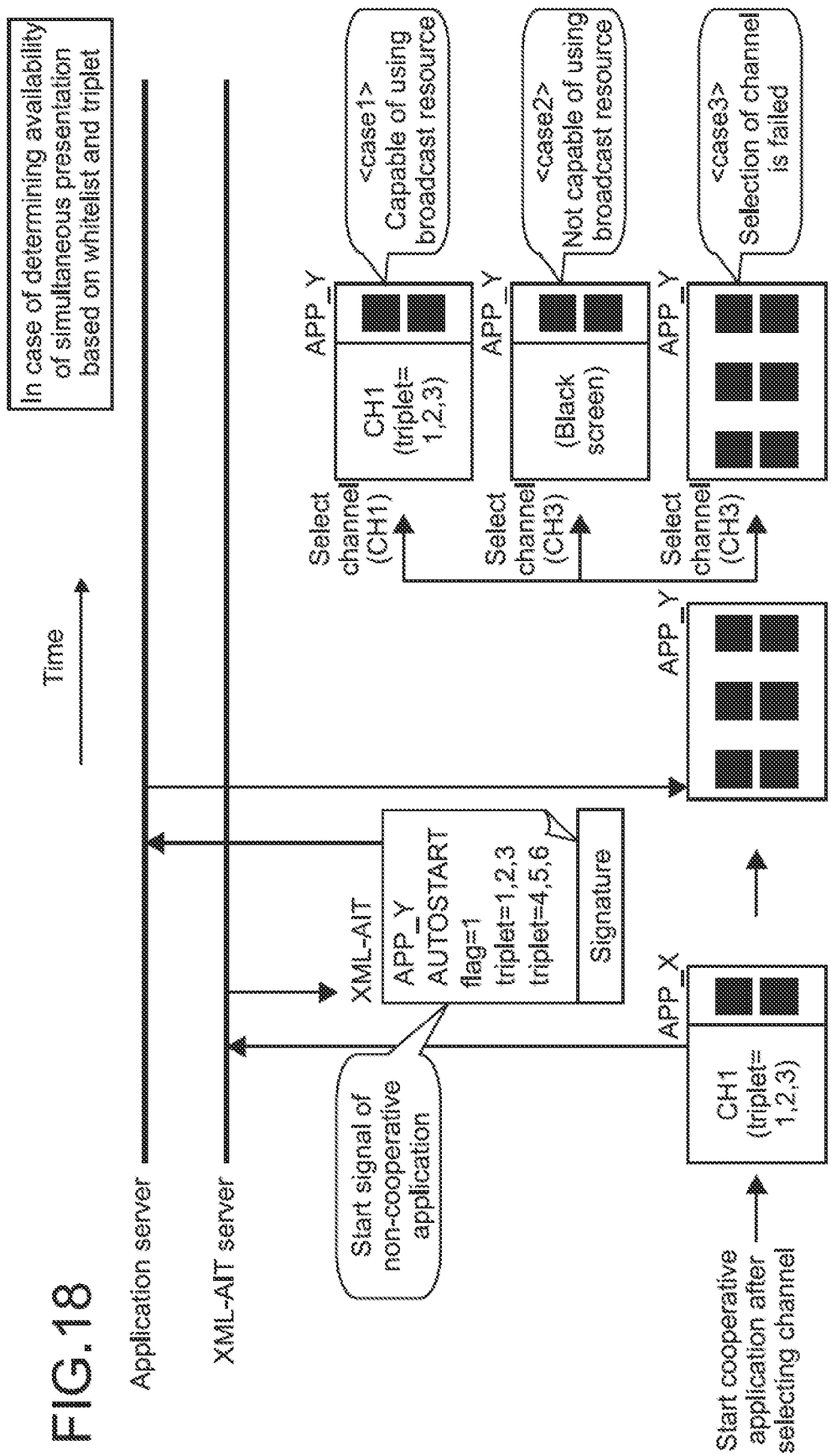
FIG. 18 A diagram showing a specific behavior example 7.

FIG. 18 is a diagram showing a specific behavior example 7.

According to the behavior example 7, an XML-AIT is obtained from the XML-AIT server.

Let's say that the information processing apparatus 700 already presents the channel CH1, which is selected by a user, and the broadcast cooperative application APP_X simultaneously. The triplet value of the channel CH1 is "1, 2, 3". A script is built in the broadcast cooperative application APP_X. The script includes createApplication( ) function, which causes the information processing apparatus 700 to obtain an XML-AIT for the broadcast non-cooperative application APP_Y.

When the broadcast cooperative application APP_X is being executed, the above-mentioned script, which is built in the broadcast cooperative application APP_X, is executed in response to an instruction by a user. As a result, the application controller 708 of the information processing apparatus 700 obtains an XML-AIT for the broadcast non-cooperative application APP_Y from the XML-AIT server 400.

The XML-AIT mainly describes the following elements.

1. Location information of broadcast non-cooperative application APP_Y
2. Application control code="AUTOSTART"
3. Grant application access flag="1"
4. Identification check type="0"
5. Triplet="1, 2, 3"
6. Triplet="4, 5, 6"

Further, an electronic signature is attached to the XML-AIT.

According to the XML-AIT, because the identification check type is "0", the triplet value is a target for comparison. Because the grant application access flag is "1", the triplet value is treated as a whitelist.

The application controller 708 of the information processing apparatus 700 obtains and analyzes the XML-AIT. The application controller 708 determines if it is possible to start the broadcast non-cooperative application APP_Y, which is specified by the XML-AIT, or not, based on the above-mentioned element values 3 to 6, and based on the triplet value of the selected channel CH1.

According to the behavior example, the triplet value of the currently-selected channel CH1 is "1, 2, 3. This is the same as the triplet value, which is described in the XML-AIT as a whitelist. As a result, the application controller 708 of the information processing apparatus 700 determines that it is possible to present the broadcast non-cooperative application APP_Y, which is specified by the XML-AIT, and the channel CH1 simultaneously.

After that, similar to the above, the application controller 708 firstly validates the electronic signature attached to the XML-AIT, executes processes after that, and finally starts the broadcast non-cooperative application APP_Y.

When the broadcast non-cooperative application APP_Y is being executed, a user of the information processing apparatus 700 selects a channel. Then, the application controller 708 of the information processing apparatus 700 determines if it is possible to present the broadcast non-cooperative application APP_Y being executed and the selected channel simultaneously or not, based on the analysis result of the XML-AIT and based on the triplet value of the selected channel.

For example, let's say that the channel CH1 is selected. The triplet value of the channel CH1 is "1, 2, 3". In this case, the triplet value of the selected channel CH1 is the same as the triplet value, which is described in the XML-AIT as a whitelist. As a result, the application controller 708 of the information processing apparatus 700 determines that it is possible to present the broadcast non-cooperative application APP_Y being executed and the selected channel simultaneously. As a result, both the broadcast non-cooperative application APP_Y and the channel CH1 are presented <case 1>.

Further, let's say that the channel CH3 is selected. The triplet value of the channel CH3 is "7, 8, 9". In this case, the triplet value of the selected channel CH3 is not the same as the triplet value, which is described in the XML-AIT as a whitelist. As a result, the application controller 708 of the information processing apparatus 700 determines that it is not possible to present the broadcast non-cooperative application APP_Y and the channel CH3 simultaneously. As a result, the broadcast non-cooperative application APP_Y is continuously executed. However, the channel CH3 is not presented <case 2 or case 3>.

In this case also, examples of methods of not presenting the channel CH3 are as follows. A black screen or the like is displayed, and a character pattern, which says that it is not possible to present the broadcast non-cooperative application APP_Y and the channel CH3 simultaneously, is superimposed on the black screen <case 2>. A screen of the broadcast non-cooperative application APP_Y continuously executed is displayed, and a message, which says that it is not possible to present the broadcast non-cooperative application APP_Y and the channel CH3 simultaneously, is added <case 3>.

[Effects of Embodiment, Etc.]

According to this embodiment, the following effects may be obtained.

1. According to this embodiment, it is possible to control simultaneous presentation of the combination of a channel or a program of broadcast content and an application. As a result, for example, such a control is available. When a program B (sponsor: company A) is broadcasted, an application, which relates to a company B, is not presented. Here, the company A and the company B are rival firms.

2. The triplet value and the event identifier value are described in an XML-AIT. The triplet value and the event identifier value may be a blacklist or a whitelist, depending on a grant application access flag. The blacklist is information identifying a channel or a program, which is not presented simultaneously with an application. The whitelist is information identifying a channel or a program, which may be presented simultaneously with an application. Because of this, a grant application access flag is set such that the amount of information to be listed is small. As a result, efficiency of creating an XML-AIT may be improved, and the XML-AIT may be downsized.

3. Depending on an identification check type of an XML-AIT, it is possible to switch from determination of possibility of simultaneous presentation of a channel and an application, to determination of possibility of simultaneous presentation of a program and an application, and vice versa.

4. As described above, according to this embodiment, it is possible to appropriately control simultaneous presentation of a channel or a program as broadcast content, and an application.

<Modified Example>

The embodiment under HbbTV standard has been described. However, the present technology is not necessarily limited to a situation under HbbTV standard.

It should be understood by those skilled in the art that various modifications, combinations, sub-combinations and alterations may occur depending on design requirements and other factors insofar as they are within the scope of the appended claims or the equivalents thereof.

DESCRIPTION OF REFERENCE NUMERALS

1 Information processing system
24 Application identification descriptor 100 Broadcast facility
200 First network
300 Application server
400 XML-AIT server
700 Information processing apparatus
701 Broadcast interface
702 Demultiplexer
703 Output processor
704 Image decoder
705 Sound decoder
706 Subtitle decoder
707 Communication interface
708 Application controller

The invention claimed is:

1. An information processing apparatus, comprising:

a broadcast content processor to receive and process broadcast content; and a controller to obtain an application information table, the application information table storing information necessary to start an application and information specifying broadcast content, the broadcast content being capable of being presented with the application simultaneously, and to determine if it is possible to present the application and the broadcast content simultaneously or not, the information specifying broadcast content includes a channel identifier, an event identifier, a first flag, and a second flag, the channel identifier specifying a channel, the event identifier specifying an event, the first flag defining if one or both of the channel identifier and the event identifier are to be treated as being allowed to be presented with the application simultaneously or to be treated as not being allowed to be presented with the application simultaneously, and the second flag defining if availability of simultaneous presentation of the application and the broadcast content is determined for each channel or for each combination of the channel and the event, and the controller utilizes the first flag and the second flag to determine if it is possible to present the application and the broadcast content simultaneously or not.

2. An information processing method, comprising:

receiving and processing, by a broadcast content processor, broadcast content; and obtaining, by a controller, an application information table, the application information table storing information necessary to start an application and information specifying broadcast content, the broadcast content being capable of being presented with the application simultaneously, and determining if it is possible to present the application and the broadcast content simultaneously or not, the information specifying broadcast content includes a channel identifier, an event identifier, a first flag, and a second flag, the channel identifier specifying a channel, the event identifier specifying an event, the first flag defining if one or both of the channel identifier and the event identifier are to be treated as being allowed to be presented with the application simultaneously or to be treated as not being allowed to be presented with the application simultaneously, and the second flag defining if availability of simultaneous presentation of the application and the broadcast content is determined for each channel or for each combination of the channel and the event, and the determining utilizes the first flag and the second flag in determining if it is possible to present the application and the broadcast content simultaneously or not.

3. A non-transitory computer readable medium having stored thereon a program, which when executed causes a computer to function as:

a broadcast content processor to receive and process broadcast content; and a controller to obtain an application information table, the application information table storing information necessary to start an application and information specifying broadcast content, the broadcast content being capable of being presented with the application simultaneously, and to determine if it is possible to present the application and the broadcast content simultaneously or not, the information specifying broadcast content includes a channel identifier, an event identifier, a first flag, and a second flag, the channel identifier specifying a channel, the event identifier specifying an event, the first flag defining if one or both of the channel identifier and the event identifier are to be treated as being allowed to be presented with the application simultaneously or to be treated as not being allowed to be presented with the application simultaneously, and the second flag defining if availability of simultaneous presentation of the application and the broadcast content is determined for each channel or for each combination of the channel and the event, and the controller utilizes the first flag and the second flag to determine if it is possible to present the application and the broadcast content simultaneously or not.

4. An application information table transmitting apparatus, comprising:

a table transmitting section to transmit an application information table, the application information table storing information necessary to start an application and information specifying broadcast content, the broadcast content being capable of being presented with the application simultaneously, the information specifying broadcast content includes a channel identifier, an event identifier, a first flag, and a second flag, and the channel identifier specifying a channel, the event identifier specifying an event, the first flag defining if one or both of the channel identifier and the event identifier are to be treated as being allowed to be presented with the application simultaneously or to be treated as not being allowed to be presented with the application simultaneously, and the second flag defining if availability of simultaneous presentation of the application and the broadcast content is determined for each channel or for each combination of the channel and the event.

* * * * *